US012675535B1

(12) United States Patent
Eick et al.

(10) Patent No.: US 12,675,535 B1
(45) Date of Patent: Jul. 7, 2026

(54) METHOD, SYSTEM AND COMPUTER PROGRAM PRODUCT FOR SEMANTIC SEARCH WITHIN AN AI-ENABLED DIGITAL HISTORICAL ARCHIVE

(71) Applicant: Bonny Broom LLC, McLean, VA (US)

(72) Inventors: Elisabeth Michelle Eick, McLean, VA (US); Mark Andrew Eick, McLean, VA (US); Denise Michelle Eick, McLean, VA (US)

(73) Assignee: Bonny Broom LLC, McLean, VA (US)

( * ) Notice: Subject to any disclaimer, the term of this patent is extended or adjusted under 35 U.S.C. 154(b) by 6 days.

(21) Appl. No.: 19/014,111

(22) Filed: Jan. 8, 2025

(51) Int. Cl.
G06F 16/93 (2019.01)
G06F 16/22 (2019.01)
G06F 16/2457 (2019.01)

(52) U.S. Cl.
CPC .......... G06F 16/93 (2019.01); G06F 16/2237 (2019.01); G06F 16/24578 (2019.01)

(58) Field of Classification Search
CPC . G06F 16/93; G06F 16/2237; G06F 16/24578
See application file for complete search history.

(56) References Cited

U.S. PATENT DOCUMENTS 5,142,665 A 8/1992 Bigus
6,678,681 B1 1/2004 Brin
(Continued)

*Primary Examiner* — Charles Rones
*Assistant Examiner* — Ken Hoang
(74) *Attorney, Agent, or Firm* — Reston Law Group, LLP; Ralph P. Albrecht

(57) ABSTRACT

A method, system and computer program product of processing a document from an electronic_historical digital archive and enabling electronic semantic searching, may include: electronic_pre-processing the electronic_ document; electronically enriching, and enabling electronically_semantic searching of the electronic document, which may digitize and make machine readable. Electronic pre-processing is a quality check of the process and not of the results. Electronic pre-processing means the translation/transformation quality of the document may or may not require alterations after translation/transformation. Electronic p re-processing embodiments may make searchable by LLMs, electronic score quality of electronically searchable document, electronically update the electronically searchable document to create a better score quality, and may include retrieval-augmented generation (RAG)-encoding, embedding LLM scoring vector and object semantics; and/or store in, an electronic database such as, e.g., an electronic database capable of storing vector data. Embodiments may receive an electronic semantic search query; provide electronic search results having LLM scoring vector and object semantics embeddings corresponding comparingly to the semantic search, and electronically enable creating software data enrichment agents to enable electronic searching for interesting historical facts; electronically building inferences with or without electronic prompts; or electronically_discovering new history such as, e.g., electronically identifying at least one connection between a plurality of said documents in the electronic historical digital archive.

23 Claims, 9 Drawing Sheets

(56)     References Cited

U.S. PATENT DOCUMENTS

| | | | |
|---|---|---|---|
| 7,949,648 | B2 | 5/2011 | Jacobsen et al. |
| 9,442,928 | B2 | 9/2016 | Szucs et al. |
| 9,442,930 | B2 | 9/2016 | Szucs et al. |
| 11,797,822 | B2 | 10/2023 | Rei et al. |
| 11,886,826 | B1 | 1/2024 | Bavarian et al. |
| 2023/0096118 | A1* | 3/2023 | Ramsl .................... G06F 40/30 |
| | | | 707/736 |
| 2025/0061141 | A1* | 2/2025 | Neervannan ........ G06F 16/3344 |

* cited by examiner

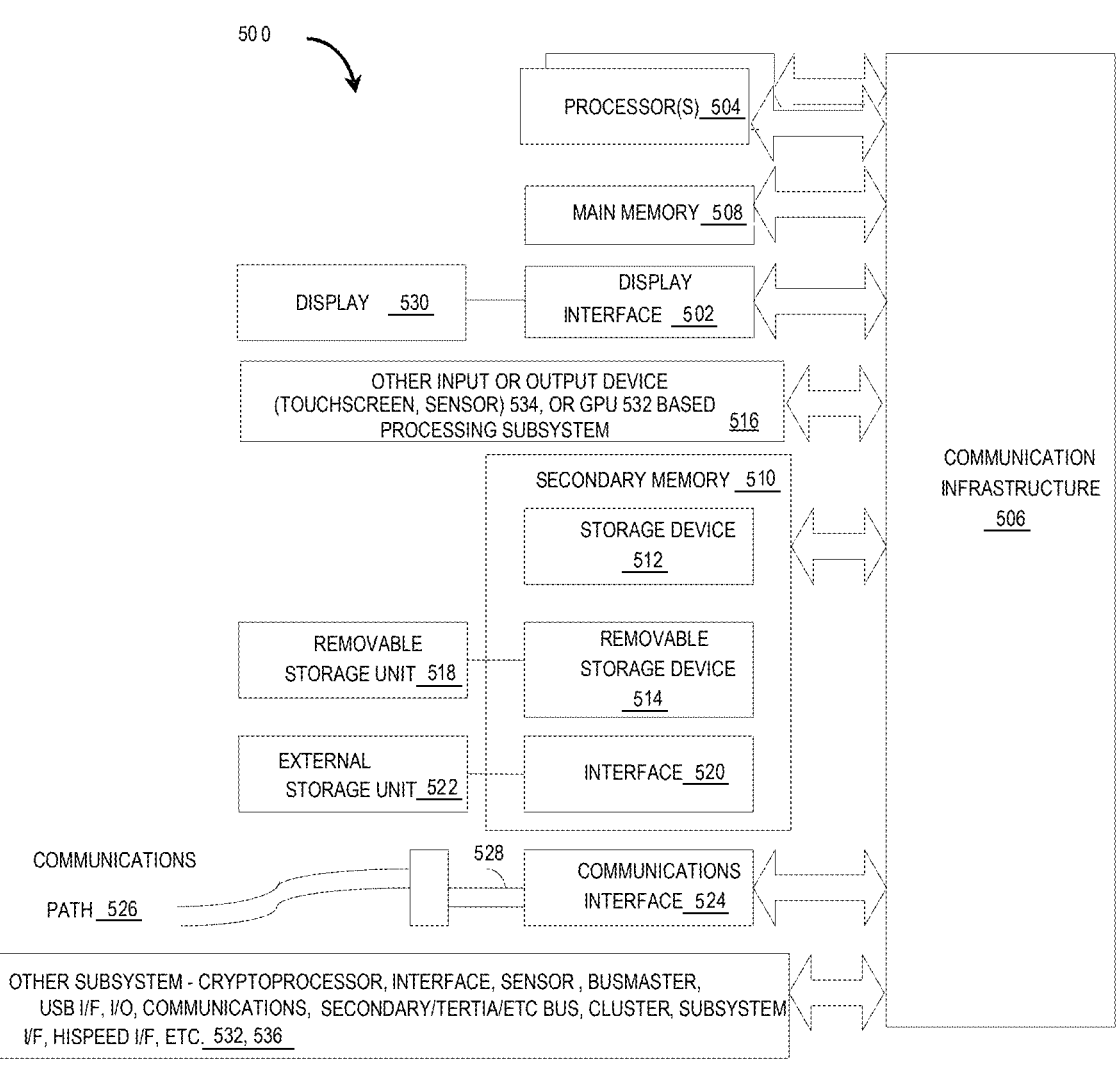

500

50 0

PROCESSOR(S) 504

MAIN MEMORY 508

DISPLAY 530

DISPLAY INTERFACE 502

OTHER INPUT OR OUTPUT DEVICE (TOUCHSCREEN, SENSOR) 534, OR GPU 532 BASED PROCESSING SUBSYSTEM 516

SECONDARY MEMORY 510

STORAGE DEVICE 512

REMOVABLE STORAGE UNIT 518

REMOVABLE STORAGE DEVICE 514

EXTERNAL STORAGE UNIT 522

INTERFACE 520

COMMUNICATIONS PATH 526

528

COMMUNICATIONS INTERFACE 524

OTHER SUBSYSTEM - CRYPTOPROCESSOR, INTERFACE, SENSOR , BUSMASTER, USB I/F, I/O, COMMUNICATIONS, SECONDARY/TERTIA/ETC BUS, CLUSTER, SUBSYSTEM I/F, HISPEED I/F, ETC. 532, 536

COMMUNICATION INFRASTRUCTURE 506

FIG. 5

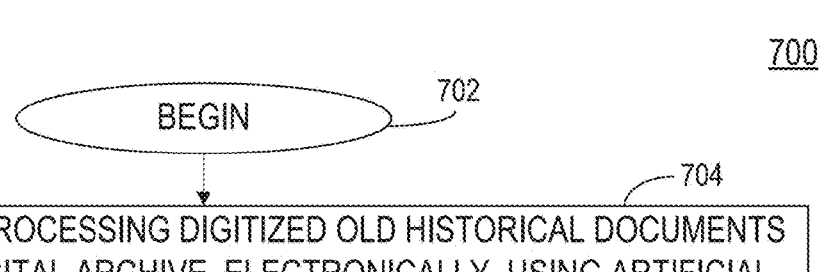

700

BEGIN — 702

704

COMPUTATIONALLY PROCESSING DIGITIZED OLD HISTORICAL DOCUMENTS OF A HISTORICAL DIGITAL ARCHIVE, ELECTRONICALLY, USING ARTIFICIAL INTELLIGENCE OR MACHINE LEARNING (AI/ML)-BASED PROCESSING TO ENABLE SEMANTIC SEARCHING OF A CORPUS OF A PLURALITY OF THE DIGITIZED OLD HISTORICAL DOCUMENTS

706

ELECTRONICALLY RECEIVING, BY AT LEAST ONE ELECTRONIC COMPUTER PROCESSOR, THE DIGITIZED OLD HISTORICAL DOCUMENT

708

ELECTRONICALLY PRE-PROCESSING THE DIGITIZED OLD HISTORICAL DOCUMENT USING ONE OR MORE LARGE LANGUAGE MODELS TO ENABLE ELECTRONIC SEMANTIC SEARCHING, SCORING SEARCHING QUALITY, ENCODING RETRIEVAL AUGMENTED GENERATION, AND EMBEDDING SCORING VECTOR AND OBJECT SEMANTIC DATA

710

OPTIONALLY, ELECTRONICALLY ENABLING CREATING DATA ENRICHMENT SOFTWARE AGENT TO ENRICH THE DOCUMENT TO MAKE INFERENCES, DISCOVER NEW HISTORY, OR INTERESTING HISTORICAL FACTS

712

OPTIONALLY, ELECTRONICALLY STORING THE DOCUMENT, SCORING VECTOR AND EMBEDDED SEMANTIC OBJECT DATA IN A VECTOR DATABASE, OR ENABLING RECEIVING SEMANTIC SEARCH QUERIES AND PROVIDING SEARCH RESULTS

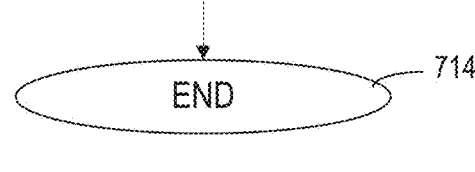

END — 714

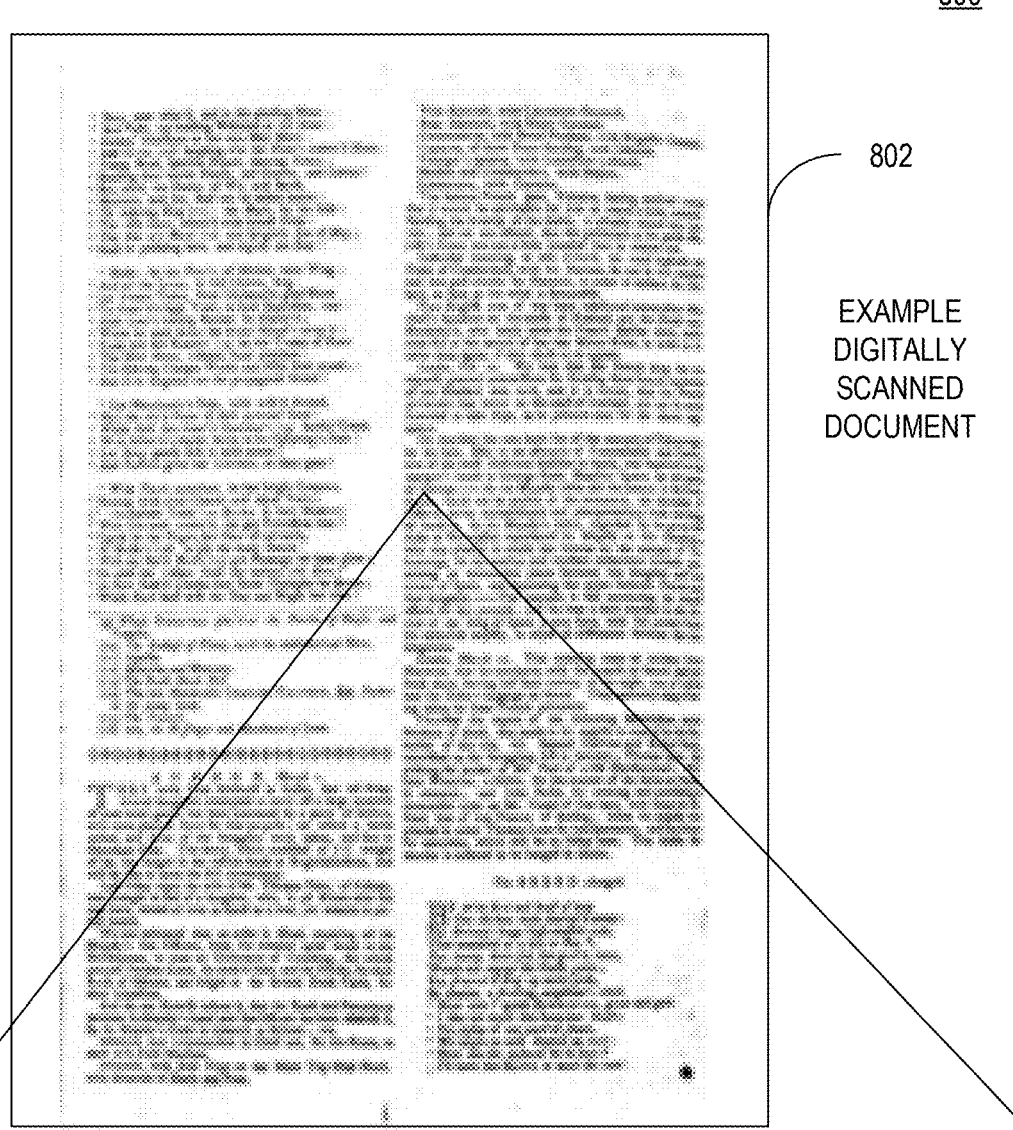

802

EXAMPLE
DIGITALLY
SCANNED
DOCUMENT

"The breed changed. By every bird and beast of prey Our chickens were conveyed away: For Britain's huge high-crested cocks, That trembled at a kite or fox, Fat, heavy, home-fed, hen-pecked, tame, Would not engage the Gallic game; Yet strutted if they up could pick, By chance, a strolling neighbour's chick. How now! quoth Brunswick, great and good, I like not much this bastard breed: For safety of our yard of fowls, We might as well depend on owls: How can the daftards be so safe? I'll have the hawk to mend the race:"

— Page 0722

900
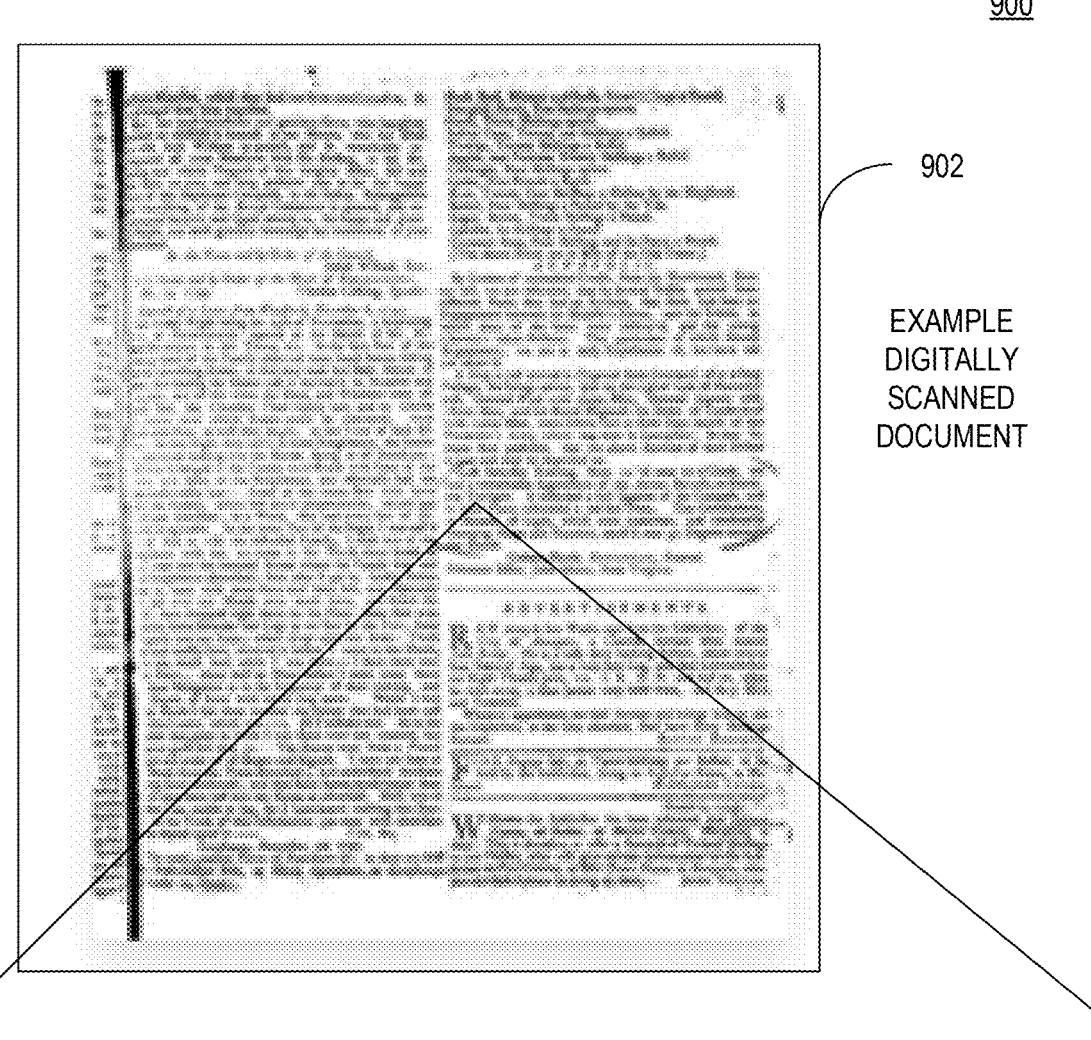
902
EXAMPLE
DIGITALLY
SCANNED
DOCUMENT
"Fresh beef, mutton, and pork, four shillings a pound. Dunghill fowls, ten shillings apiece. Geese, thirty shillings apiece."
— Page 0214
904
906
FIG. 9

METHOD, SYSTEM AND COMPUTER PROGRAM PRODUCT FOR SEMANTIC SEARCH WITHIN AN AI-ENABLED DIGITAL HISTORICAL ARCHIVE

BACKGROUND OF THE DISCLOSURE

Field of the Disclosure

This present disclosure relates generally to artificial intelligence (AI), and more particularly to AI processing of textual content.

Description of the Related Art

Documents can be electronically digitized or captured and converted into digital content, allowing for electronic access to the digital content, according to conventional systems.

Conventionally, when someone wishes to analyze old historical documents, a user may need to travel to an archive location, and manually view documents on microfilm, microfiche, and sometimes even paper, according to one example embodiment. Conventional digital archives, merely scan in documents and may allow reviewing a scanned in document, akin to reviewing a microfilm or microfiche. Conventionally, digital archives do not, nor cannot, create a searchable version of the digital archive document. End users thus are conventionally left to manually review documents and to perform visual and/or at most keyword searches.

Improved systems that overcome shortcomings of conventional digital archive computing systems, are needed.

SUMMARY OF THE INVENTION

According to example embodiment, a computer implemented method of processing at least one document from at least one historical digital archive and enabling semantic searching of the at least one document, the method may include: electronically pre-processing, by at least one computer processor, the at least one document; electronically enriching, by the at least one computer processor, the at least one document; and electronically enabling, by the at least one computer processor, the semantic searching of the at least one document, according to one example embodiment.

Example embodiments of the present disclosure may be directed to a method where the electronically pre-processing may include at least one or more of: electronically retrieving, by the at least one computer processor, the at least one document from the at least one historical digital archive; and electronically storing, by the at least one computer processor, the at least one document in at least one database, where the at least one database is capable of storing vector data, according to one example embodiment.

Example embodiments of the present disclosure may be directed to a method where the electronically pre-processing may include at least one or more of: electronically enabling, by the at least one computer processor, searching of the at least one document via at least one large language model (LLM); electronically scoring, by the at least one computer processor, searching quality of the at least one document to obtain at least one LLM scoring vector; electronically encoding, by the at least one computer processor, retrieval augmented generation (RAG) to the at least one LLM; electronically embedding, by the at least one computer processor, the at least one LLM scoring vector and object semantic data; or electronically storing, by the at least one computer processor, the at least one document, along with the at least one LLM scoring vector and object semantic data in at least one database, where the at least one database is capable of storing vector data, according to one example embodiment.

Example embodiments of the present disclosure may be directed to a method where the electronically enriching of the at least one document may include at least one or more of: electronically enabling, by the at least one computer processor, searching of the at least one document via at least one large language model (LLM); electronically scoring, by the at least one computer processor, searching quality of the at least one document to obtain at least one LLM scoring vector; electronically encoding, by the at least one computer processor, retrieval augmented generation (RAG) to the at least one LLM; electronically embedding, by the at least one computer processor, the at least one LLM scoring vector and object semantic data; electronically enriching, by the at least one computer processor, the at least one document by electronically creating at least one data enrichment software agent; electronically enriching, by the at least one computer processor, the at least one document by electronically creating at least one open source data enrichment software agent; electronically enabling, by the at least one computer processor, creating of at least one new data enrichment agent; electronically enabling, by the at least one computer processor, creating of at least one new data enrichment software agent; electronically enabling comparing, by the at least one computer processor, the at least one document via at least one new data enrichment agent; electronically enabling comparing, by the at least one computer processor, the at least one document via at least one background new data enrichment agent; electronically enabling searching, by the at least one computer processor, the at least one document via at least one new data enrichment agent; electronically enabling, by the at least one computer processor, searching the at least one document for at least one interesting fact via at least one new data enrichment agent; electronically machine training building inferences, by the at least one computer processor, from the at least one document via at least one new data enrichment agent; or electronically machine training discovering, by the at least one computer processor, at least one new history (e.g., by identifying at least one connection between a plurality of said documents in the at least one historical digital archive) from the at least one document via at least one new data enrichment agent, according to one example embodiment.

Example embodiments of the present disclosure may be directed to a method where the electronically enabling of the semantic searching of the at least one document may include at least one or more of: electronically enabling, by the at least one computer processor, searching of the at least one document via at least one large language model (LLM); electronically scoring, by the at least one computer processor, searching quality of the at least one document to obtain at least one LLM scoring vector; electronically encoding, by the at least one computer processor, retrieval augmented generation (RAG) to the at least one LLM; electronically embedding, by the at least one computer processor, the at least one LLM scoring vector and object semantic data; electronically computing, by the at least one computer processor, at least one semantic embedding via the at least one LLM; electronically storing, by the at least one computer processor, the at least one semantic embedding in the at least one document; electronically formatting, by the at least one computer processor, the at least one document for a desired format; electronically formatting, by the at least one computer processor, the at least one document for a desired display format; or electronically formatting, by the at least one computer processor, the at least one document for a desired browser display format, according to one example embodiment.

Example embodiments of the present disclosure may be directed to a method where the method may further include electronically receiving, by the at least one computer processor, at least one semantic search query; electronically comparing, by the at least one computer processor, the at least one semantic search query to at least one LLM-computed semantic embedding of a given document to obtain at least one semantic search result document; electronically readying, by the at least one computer processor, for display the at least one semantic search result document; and electronically displaying, by the at least one computer processor, the at least one semantic search result document, according to one example embodiment.

Example embodiments of the present disclosure may be directed to a method where the at least one document may include at least one digitized version of at least one or more of: a historical document; a historical newspaper; a newspaper of a substantially earlier period than an LLM training time period; a historical document of an earlier period; a historical document including regional colloquialisms, or dialects; a historical document from 1600s-1800s; a historical document from 1600s through today; a historical document from 1800s through today; a historical document from earlier than 1900; a historical document from earlier than 1860s; a historical document from the early 1800s; a historical document from earlier than 1800; a a historical document from another language; a pre-1900 historical document; a pre-1800 historical document; a document from pre-civil war era; a document from the 1900s; a historical document published between 1600 and 1899; a historical document published from 1800 through today; a pre-modern historical document published from about 1600 through the 1800s; a late-modern historical document published from about 1800 through today; a historical document published between 1550 and today; a document from 1600 or more recently; a document from 1700 and more recently; a document from 1800 or more recently; a document from 1900 or more recently; a document from pre-civil war era; a document from the 1900s; a historical document published between 1600 and 1899; a historical document published from 1800 through today; early modern English historical document; a late modern English historical document; a pre-modern historical document published from about 1600 (A.D.) through the 1800s; a late-modern historical document published from about 1800 through today; a poorly preserved historical document; or a deteriorated historical document, according to one example embodiment. According to one example embodiment, pre-modern may cover documents from about 1600s-1800s, and late modern may cover documents from 1800s and more recently, according to an example embodiment.

Example embodiments of the present disclosure may be directed to a method where the electronically enabling of the semantic searching of the at least one document may include: electronically enabling, by the at least one computer processor, searching of the at least one document via a two or more of large language models (LLMs), according to one example embodiment.

Example embodiments of the present disclosure may be directed to a method where the electronically enabling searching of the at least one document via the two or more of large language models (LLMs) may include at least one or more of: electronically scoring, by the at least one computer processor, results of the two or more of LLM models; or electronically enabling, by the at least one computer processor, searching of the at least one document via the two or more of large language models (LLMs) wherein the two or more may include an LLM selected from at least one or more of: CHATGPT; CLAUDE; GEMINI; LLAMA; GROK; MISTRAL; PALM2; FALCON; STABLE LM; MIXTRAL; INFLECTION; JAMBA; COMMAND R; GEMMA; PHI; XGEN; DBRX; *PYTHIA*; SORA; ALPACA; NEMOTRON, or a custom LLM, according to one example embodiment.

Example embodiments of the present disclosure may be directed to a method where the at least one document is stored in a format which may include: a portable document format (PDF), JPG, GIF, other computer readable formats a, and other computer readable format; a Word document (DOC), DOCX, .doc, or .docx. format; an audio video interleave (AVI) format; a motion picture entertainment group (MPEG), MPEG Group4, .mpg, mpeg, mpeg3, x-mpeg-3, mpeg, x-mpeg, or mp3 file format; a flash video format, or flv format; a QuickTime (MOV), or .mov format; a Windows Media (WMV), or .wmv format; an image file format; an audio file format; a waveform audio file, wav, or wave file format; an audio interchange file, .aif, or .aiff file format; an ARC, .arc, or .arc .gz file format; a Web ARChive file, .warc, or .warc .gz file format; a portable network graphics file (PNG), or .png file format; a spreadsheet or Excel file (XLS), .xls, .xlsx, or .csv format; a Powerpoint (PPT), .ppt, .pptx format; a hypertext markup language (HTML), .html, or .htm file format; a text (.txt) file format; a Matroska (.mkv) format; an encapsulated post script (EPS) format; an ASCII format file; an EBCDIC format file; a JSON format file; a MQTT format file; or a tagged image file format (TIFF), .tif, or tiff formats, or other formates according to one example embodiment.

Example embodiments of the present disclosure may be directed to a method where the method further may further include at least one or more of: electronically storing the at least one document into at least one database, where the at least one database, according to one example embodiment may include a database capable of storing vector data, in one example embodiment, the database may be a relational or other database, etc.; electronically storing the at least one document into at least one structured query language (SQL) query-enabled relational database; electronically enabling, by the at least one computer processor, semantic search of historical documents; electronically defining, by the at least one computer processor, limits of semantic search; electronically enabling, by the at least one computer processor, creating searchable historical documents; electronically enabling, by the at least one computer processor, creating searchable historical documents, wherein the historical documents are from prior to 1900; electronically enabling, by the at least one computer processor, software agents for data enrichment enabling electronic learning and electronically creating new and different historical inferences; or electronically enabling, by the at least one computer processor, open source software agents for data enrichment enabling electronic learning and electronically creating new and different historical inferences, according to one example embodiment.

Example embodiments of the present disclosure may be directed to a method where the method may further include at least one or more of: electronically enhancing, by the at least one computer processor, by at least one retrieval augmented generation (RAG) enhanced, LLM scoring, vector and object semantic embeddings of the at least one document and electronically storing along with the at least one document in at least one database where the at least one database is capable of storing vector data; electronically computing, by the at least one computer processor, at least one new LLM embedding and electronically storing, by the at least one computer processor, in at least one database where the at least one database is capable of storing vector data; electronically processing, by the at least one computer processor, at least one semantic search request LLM embedding; electronically comparing, by the at least one computer processor, the at least one semantic search request LLM embedding with the at least one new LLM embedding stored in the database where the database is capable of storing vector data to identify results; electronically enabling, by the at least one computer processor, creating at least one data enrichment agent, wherein the at least one data enrichment agent is configured to make inferences based on stored data and user queries; electronically enabling, by the at least one computer processor, creating at least one data enrichment agent, wherein the at least one data enrichment agent is configured to learn and discover new history, e.g., by identifying at least one connection between a plurality of said documents in the at least one historical digital archive, etc.; electronically enabling, by the at least one computer processor, creating at least one data enrichment agent, wherein the at least one data enrichment agent is configured to run over a corpus of data; or electronically enabling, by the at least one computer processor, creating at least one data enrichment agent, wherein the at least one data enrichment agent is configured to be open source so any end user can program their own data enrichment agent to find data, according to one example embodiment.

According to another example embodiment, a system of processing at least one document from at least one historical digital archive and enabling semantic searching of the at least one document, the system may include: at least one electronic computer processor, coupled to at least one electronic memory storage device and coupled via at least one communications interface, coupled to at least one data communications network, the system may include wherein the at least one electronic computer processor is configured to: electronically pre-process the at least one document; electronically enrich the at least one document; and electronically enable the semantic searching of the at least one document, according to one example embodiment.

According to yet another example embodiment, a computer program product embodied on a computer accessible nontransitory storage medium, may include at least one electronically stored instruction, which when executed on at least one electronic computer processor performs a method of processing at least one document from at least one historical digital archive and enabling semantic searching of the at least one document, the method may include: electronically pre-processing the at least one document; electronically enriching the at least one document; and electronically enabling the semantic searching of the at least one document, according to one example embodiment.

Example embodiments of the present disclosure may be directed to a method where the at least one document may include at least one digitized and machine readable document, according to one example embodiment.

Example embodiments of the present disclosure may be directed to a method where the pre-processing of the at least one document may include: electronically making searchable, by the at least one computer processor, the at least one document with a two or more of LLMs to create at least one electronically searchable document; electronically scoring, by the at least one computer processor, the quality of the at least one electronically searchable document; electronically retrieval-augmented generation (RAG)-encoding, by the at least one computer processor, to the two or more of LLMs at least one historical insight (e.g., by identifying at least one close association between a given two documents based on similar feature vectors of the given two documents, as determined by the system, etc.), according to an example embodiment); electronically embedding, by the at least one computer processor, at least one LLM scoring vector and object semantics embeddings; and electronically storing, by the at least one computer processor, the at least one electronically searchable document with the at least one LLM scoring vector and object semantics embeddings in at least one database, where the at least one database is capable of storing vector data, according to one example embodiment.

Example embodiments of the present disclosure may be directed to a method further including at least one or more of: electronically receiving, by the at least one computer processor, at least one semantic search; and electronically providing, by the at least one computer processor, at least one search result of at least one electronically searchable document with the at least one LLM scoring vector and object semantics embeddings corresponding comparingly to the at least one semantic search from at least one database where the at least one database is capable of storing vector data, according to one example embodiment.

Example embodiments of the present disclosure may be directed to a method further including at least one or more of: electronically creating, by the at least one computer processor, at least one software data enrichment agent to enable searching, by the at least one computer processor, for at least one or more of: interesting historical facts; building inferences; or discovering new history (e.g., by identifying at least one connection between a plurality of said documents in the at least one historical digital archive, etc.), according to one example embodiment.

This disclosure, according to example embodiments may expressly include any and all combinations and sub-combinations, permutations and combinations, of any and all example elements and/or features presented above and below.

BRIEF DESCRIPTION OF THE VARIOUS EXAMPLE VIEWS OF THE DRAWINGS

This present disclosure will be fully understood with reference to the following detailed description when taken in conjunction with the figures, herein:

FIG. 5 depicts an example embodiment of an example component level example hardware architecture for an example computing device as may be used for any of various example hardware subsystem components of an example system, according to one example embodiment;

FIG. 7 depicts an example embodiment of a flow diagram, according to an example embodiment;

FIG. 8 depicts an example block diagram illustrating an example scanned historical document and processed data, according to an example embodiment; and FIG. 9 depicts an example block diagram illustrating another example scanned historical document and processed data, according to an example embodiment.

DETAILED DESCRIPTION OF VARIOUS EXAMPLE EMBODIMENTS OF THE INVENTION

Figure 1:
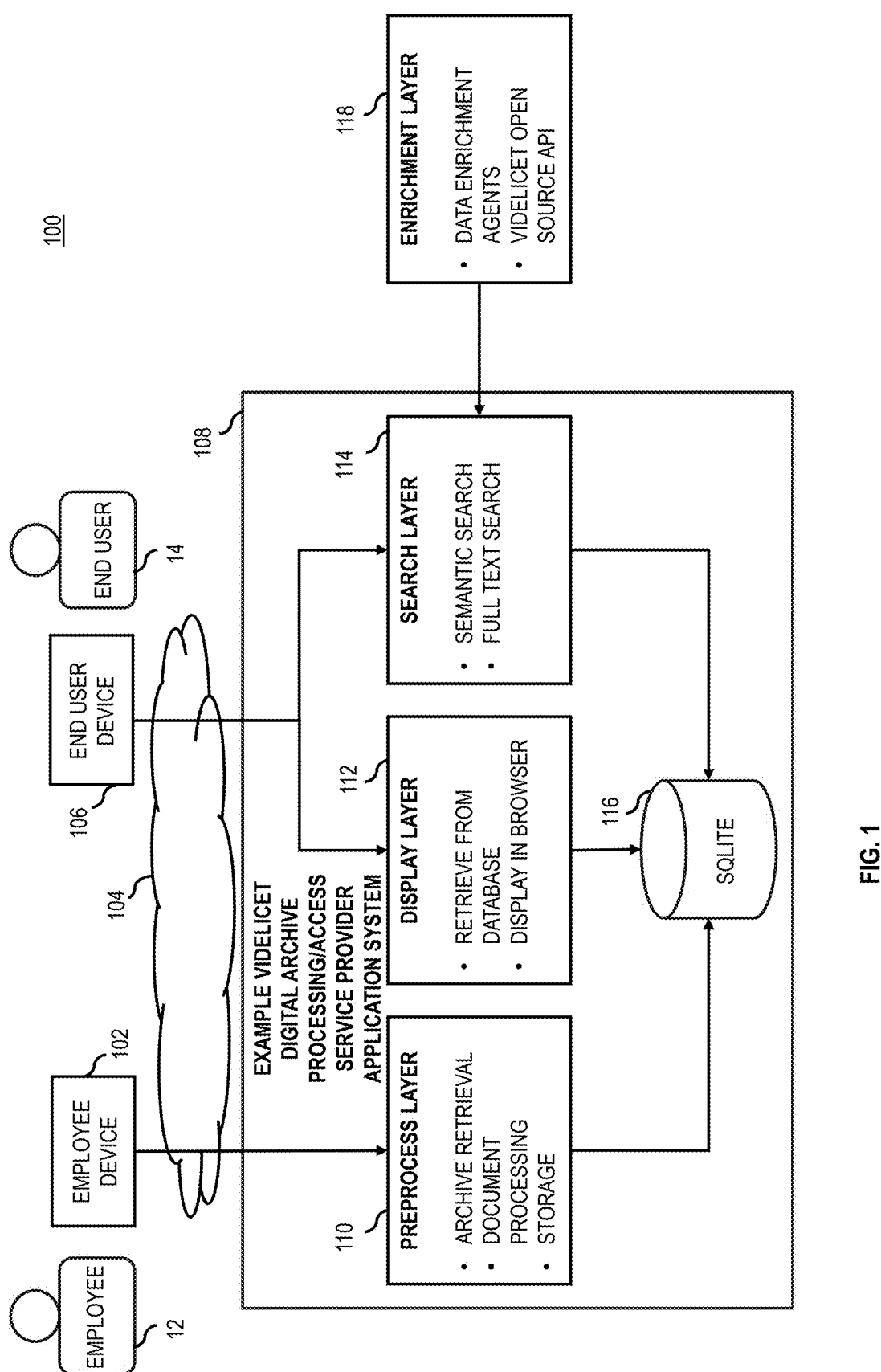
FIG. 1 depicts an example embodiment of a block diagram illustrative of an example high level system architecture and logical process view of an example application server, according to one example embodiment.

The various embodiments of the invention described herein should not be limited to the description, even with reference to the accompanying figures and drawings depicted, but only with respect to the claims. The invention may be embodied in different forms and should not be restricted as set forth here.

Overview of Various Example Embodiments

Example embodiments of the claimed invention may relate to semantic search within an AI-enabled digital historical archive, according to one example embodiment. More particularly, various example embodiments may relate to systems and methods for processing both very old documents where the language of the text, which e.g., but not limited to, may include a different version of the American English language than used at present, as well as modern day documents, (or other relevant language of the document or content). According to example embodiments, an improved system, method and computer program product may include adding AI features, according to one example embodiment, with, e.g., but not limited to, open source, etc., example software agents that can run over a digitized corpus of data and may continually electronically learn and change the electronic digital model, according to one example embodiment.

Digital archives, according to one example embodiment may include a new and innovative way to make historical documents available online, according to one example embodiment. Conventionally, an end user would need to travel to an archive location, and manually view documents on microfilm, microfiche, and sometimes even paper, according to one example embodiment. Digital archives, according to one example embodiment, make these documents available within a web browser, according to one example embodiment. Most conventional scanned digital archives do not conventionally, nor cannot conventionally, create a searchable version of the scanned document. End users, conventionally, are left to manually review documents and to at most perform visual keyword searches, after using optical character recognition to identify characters in the scanned document. A feature of the Videlicet-branded improved digital archive, according to one example embodiment, is to allow an end user to perform a semantic search on historical documents in an instant, according to one example embodiment.

The Library of Congress funded a first example digital archive effort called Newspaper Navigator (see https://news-navigator.labs.loc.gov/search), which allows an end user to search by keyword, occurrences of a keyword in a scanned digital archive of 1.56 million historic newspaper photos from 1900 through 1963. A user's search encompasses the years 1900 through 1963 as noted. This means documents written in current day, modern American English and current OCR tools can recognize the text. Additionally, Newspaper Navigator provides only a keyword search. Newspaper Navigator fails to provide any semantic search capability. Lack of semantic search enablement, according to one example embodiment, means that meaning cannot be inferred from the data. Inferred results are critical for a user. Underlying history, according to one example embodiment, can be deduced from within a digital archive, according to one example embodiment.

Another example digital archive research effort is the AIDA project. The University of Nebraska, also funded by the Library of Congress, published a report on Jan. 10, 2020. The findings of this report are accessible at the URL (https://labs.loc.gov/static/labs/work/experiments/final-report-revised_june-2020.pdf). The AIDA project has had varying success in processing the data. The AIDA project also does not provide any semantic search, nor data inference. The AIDA project's main focus is OCR generation.

According to an example embodiment of the claimed invention, Applicant's technology distinguishes over these conventional OCR/keyword search digital archives, in that in an example embodiment, Applicant's claimed invention can create searchable historical documents, where the digital archived documents are from prior to 1900, with excellent results. An end user, according to one example embodiment, is able to do keyword as well as semantic search, according to one embodiment. Most importantly, according to an example embodiment, the claimed system is trained to learn and grow, over time, iteratively, based on the types of searches being performed and according to an example embodiment, the system and method may infer historical facts and data that were previously not discovered, according to one embodiment.

According to one example embodiment, Applicant's system may be used to go historical digital archive by historical digital archive to determine which LLM to use, and how the LLM best operates to electronically feed in, and to improve making the historical digital archive's electronic document data, electronically readable. Example embodiments of the claimed invention can process electronically captured documents, electronically improving the quality of machine readable data capture, performing electronic processing including, e.g., but not limited to, electronically capturing, electronically digitizing, electronically reading, electronically processing via modifying brightness and contrast electronically, increasing machine readability, anti-aliasing captured data, electronically processing digital data, removing noise and/or unwanted data from old, deteriorated images, processing poorly preserved documents, electronically modifying captured data, normalizing background, etc., according to various example embodiments. Example embodiments may include processing historical document content data making such data more machine readable, and/or may include building customized new LLMs specifically for capturing and processing such poorly preserved historical documents and deteriorated images, electronically scoring existing LLMs, and electronically identifying which LLMs are best for which types of historical documents, according to example embodiments.

According to one example embodiment, improved searching may be enabled on a private digital archive corpus, according to example embodiments of the claimed invention.

Overview of Underlying Technology

With the advent of the world-wide web (www) in the 1990s, search engines were developed to ease electronically searching digital content of captured digital content documents. Early search engines allowed searching of hierarchical data, and later through relevancy searching improved technologies for searching arose. A search engine is a software-based computer system that conventionally provides hyperlinks to web pages and other relevant information on the web in response to a user query. The user may conventionally input a query within a web browser or a mobile application, and the search may result often in a list of hyperlinks, accompanied by textual summaries or images. Conventionally, a user may also further limit the search to a specific type of search results, such as images, videos, or other type of content. A search provider's search engine is part of a distributed computing system that conventionally may encompass many data centers throughout the world. The speed and accuracy of a given search engine's response to a query is based on a complex system of processing, which may include indexing, continuously updated, by, e.g., automated software agent programs sometimes referred to as spiders or web crawlers. Such processing can include analyzing and indexing files or databases stored on web servers, but conventionally some content is not accessible to crawlers. The reader is directed to U.S. Pat. No. 7,949,648, issued May 24, 2011, the contents of which is incorporated herein by reference in its entirety.

Early computerized searching from the 1950s onward looked for exact terms in a query, and might include logical operators, often referred to as Boolean search, using logical operands like OR, AND, XOR (exclusive or), NOT, and/or other proximity operators like within X words of another word.

Conventional search engines continue to have various shortcomings.

Keyword or lexical searching seeks to find exact matches between search queries and the data to be searched. These exact match searches have shortcomings in that not everyone uses the same words to refer to something. Lexical searching relies on an exact match of a word or group of words, and so if a query does not use those exact words, e.g., due to use of synonyms, or a misspelling, or where a word may have multiple meanings, sometimes even opposite meanings depending on context, then the search results will miss potentially important results. Semantic searching arose to attempt to overcome this shortcoming of lexical searching.

As noted above, semantic search refers to search with meaning, as distinguished from lexical search where the search engine looks for the literal match of the query's words or variants of the words, without understanding the overall meaning of the query. Semantic search seeks to generate more relevant results by improve search accuracy by understanding a user's intent and the contextual meaning of terms as they appear in a searchable dataspace, whether, e.g., on the web, or within a closed body or corpus system. General search engines did not always work well on complex scientific or mathematical data, so some specialized search engines like WOLFRAM ALPHA were developed to address special technical language areas.

There have been many search engines since the dawn of the web including YAHOO Search, LYCOS, EXCITE, ALTAVISTA, BING, DUCKDUCKGO, BAIDU, ASK, among many others, but Google Search became the dominant search engine in the 2000s and has remained dominant for several decades. Google's success early related to its search technology, Larry Page and Sergey Brin founded Google, and one its patents U.S. Pat. No. 6,678,681, issued Jan. 13, 2004, related to ranking results by analyzing hypertext links, the contents of which are incorporated herein by reference in their entirety. YAHOO gained substantial early success when it licensed Google's early search technology to improve its search results. Google's market success and share became so great that it attracted antitrust scrutiny. Eventually entire businesses evolved to attempt to improve a business' visibility, known as search engine optimization (SEO) from various companies including YOST and others. Google later acquired various Internet advertising companies and today makes much more money from advertising revenue, as it sells various sponsored advertisements.

Improved systems that overcome shortcomings of conventional search systems continue to be needed. Other technologies such as topic identifiers, see e.g., U.S. Pat. Nos. 9,442,928 and 9,442,930, the contents of which are incorporated herein by reference in their entirety. Such topic identifiers built on Claude Shannon's information theory to seek summarization of lengthy content, have been developed but search results have not been improved for some time with the focus on advertising.

Artificial intelligence (AI) technologies are playing a role in changing these search technologies. AI relates to a field of computer science concerned with building computerized machines and software that can reason, learn via the machine, perceive their environment, and to obtain intelligence to take action based on rules, first described by Alan Turing and his contemporaries. AI may relate to rules-based expert systems, decision support systems, may involve logical reasoning, machine learning (ML), natural language processing (NLP), perception, predictive elements, and have application to many technologies. AI became a discipline in the mid-1950s and has accelerated more recently with the introduction of deep learning, transformer recurrent neural architectures, convolutional neural networks, and the early 2020s with generative AI and general large language models (LLMs).

Machine learning (ML) involves using statistical algorithms to train a computer system based on large amounts of data such as documents or other content, and has been applied to such fields as, e.g., but not limited to speech recognition, natural language processing, computer vision, and may use different approaches or techniques to build statistical models based on the training data. One approach includes supervised learning where a teacher maps inputs to outputs, another is unsupervised learning where a model identifies patterns and structures in unlabeled data, and yet another technique is reinforcement learning via interaction with a computer while performing a task, and providing the algorithm feedback and scoring.

Thus, supervised ML models, provide a form of AI including highly parameterizable functional relationships between an input and output space. These models "learn" a best-fit of parameters through real data examples by optimizing a notion of error or cost between predicted outputs and the grounded truth. Neural networks (NNs) are a type of machine learning model that may include various layers of operations. One example of an NN may be found in U.S. Pat. No. 5,142,665, the contents of which is incorporated herein by reference in its entirety. Transformations, defined by a set of parameters, are performed at each layer starting from the inputs, with the results from the operations being passed into the next layer until reaching the output. These models can be downloaded as modules and may be distributed across computational devices such as computers or mobile devices. Types of supervised learning algorithms may include active learning, classification and regression.

Convolutional neural networks (CNNs) are a type of neural network in which a transformation is defined by a convolution. CNNs have been implemented heavily in tasks involving the input of an image due to the convolution operator's ability to extract local salient features. CNNs are highly effective at identifying objects and location of objects within images or other content. The reader is directed to U.S. Pat. No. 11,797,822, issued Oct. 24, 2023, for an example artificial NN, the contents of which is incorporated herein by reference in its entirety.

Large language models (LLMs) are a type of computational model designed for natural language processing tasks such as language generation. As language models, LLMs acquire these abilities by learning statistical relationships from vast amounts of text during a self-supervised and semi-supervised training process. Today's largest and most capable LLMs are built on large artificial neural networks with decoder-only transformer-based architectures. Prompt engineering can guide or tune these LLMs. These LLM models can use syntax, semantics and ontologies, which are inherent in human language corpora, but inherit biases in data, inaccuracies, gaps, and lack ability to determine the truthfulness of data. Prompts may be tokenized, and various LLMs limit the number of tokens. Chat-GPT ("generative pre-trained) is an example LLM, and has gone through various versions (1, 2, 3, 4, 40, 40 mini, SearchGPT, etc.), available from OPENAI, a now for profit company, originally focused on not for profit activity. MICROSOFT offers CoPilot built on top of ChatGPT. Various other LLMs include CLAUDE from Anthropic, GEMINI from Google, Llama, an open source model from META, Grok from Xai of Elon Musk, Ernie and Grok, and others. Others include BERT, BLOOM (source available like LLaMA), and others. The reader is directed to U.S. Pat. No. 11,886,826, issued Jan. 30, 2024, for an example large language model related patent from OpenAI, the contents of which is incorporated herein by reference in its entirety.

Conventional digital archive systems still have various shortcomings. Applicants' claimed invention seeks to overcome the shortcomings of conventional private corpus digital archive systems by incorporating various technologies to provide certain features as set forth in the example claims.

FIG. 1 depicts an example embodiment of a block diagram 100 illustrative of an example high level system architecture and logical process view of an example application server, according to one example embodiment. FIG. 1 depicts an example embodiment of a high level system design architecture diagram, according to one example embodiment.

According to an example embodiment, FIG. 1 may set forth an example High Level System 100, according to one example embodiment, which may include, e.g., but not limited to, according to one example embodiment, an example Videlicet digital archive processing/access service provider application system 108, which, according to one example embodiment, may have various example parts that may include, e.g., but not limited to, an example preprocessing cycle layer 110, an example display layer 112, and an example search engine layer 114, according to one example embodiment. Example employee user(s) 12, according to one example embodiment may have access, such as, e.g., but not limited to, to the preprocessor 110 and search engine 114, according to one example embodiment, via an example employee user client device 102, according to one example embodiment, which may be directly coupled to the system 108, or via an example data communications network 104, according to one example embodiment, via, e.g., but not limited to, via an internet browser-based user interface application, according to one example embodiment. According to one example embodiment, an example end user 14 may access, according to one example embodiment, via an example end user device 106, which may, according to one example embodiment, be coupled via one or more web servers and/or other network devices of communications network 104 to the example system 108, and may, according to one example embodiment only have access to the example search engine 114, according to one example embodiment.

Before a document can be searchable, according to one example embodiment, the document may be fed through the example preprocessor 110, according to one example embodiment. An employee 12, according to one example embodiment, may visit example historical archive, according to an example embodiment, may physically gather the necessary physical documents and may convert the documents, by electronic capture via, e.g., but not limited to, an electronic scanner, and/or digital camera, etc., to convert the documents contents into an example machine readable electronically digitized format, according to one example embodiment. These electronic documents may be fed through the example preprocessor 110, which may electronically index the electronically machine readable documents' contents, make the contents of these electronically machine readable documents searchable, via, e.g., but not limited to, optical character recognition (OCR) and/or other processes of electronically machine reading identification of the contents of the electronic document, via, e.g., but not limited to, using machine learning and/or artificial intelligence based processing of the electronically accessible document content, and may be made readable via and/or accessible via, e.g., but not limited to, employee device 102, or other electronic computer processor-based system electronically coupled to the example videlicet digital archive processing/access service provider application system 108, which may electronically compute via one or more electronic computer processors, the embeddings, and/or to electronically store the electronic digital captured contents of the documents into, e.g. but not limited to, a database such as, e.g., but not limited to, SQLLITE 116, according to an example embodiment of the example videlicet digital archive processing/access service provider application system 108, according to one example embodiment.

Example preprocess layer 110, according to one example embodiment, may include archive retrieval functionality, document processing functionality and/or document storage and/or management functions, etc., according to one example embodiment.

Example display layer 112, according to one example embodiment, may include retrieve from example database functionality, display in browser functionality and/or document formatting and/or processing functions, etc., according to one example embodiment.

Example search layer 114, according to one example embodiment, may include example semantic search functionality, full text search functionality and/or other example, well known example search functions from lexical, and specialized data repositories, etc., according to one example embodiment.

Example database layer 116, also labeled SQLLITE in the example illustration, according to one example embodiment, may include a database management system, which may include any of various example database management system types from, e.g., relational databases, such as, e.g., but not limited to, a structured query language (SQL) type query language, and/or other database types such as, e.g., but not limited to, noSQL or graph type databases, hierarchical databases, flat file databases, and any other example database, as will be apparent to those skilled in the relevant art, etc., according to one example embodiment.

After the electronically captured document and contents is loaded into the example videlicet digital archive processing/access service provider application system 108, an end user 14, via, e.g., but not limited to, an end user device 106, via, e.g., but not limited to, an example coupled communications network 104 and/or other coupling, can, e.g., but not limited to, electronically search the electronically captured document(s), according to one example embodiment, or the example videlicet digital archive processing/access service provider application system 108, according to one example embodiment may electronically display, according to one example embodiment, the entire document via, according to one example embodiment an example Internet hypertext transfer protocol (HTTP) electronic browser, on, e.g., but not limited to, end user device 106, according to one example embodiment, without any search parameters, according to one example embodiment. According to one example embodiment, the example videlicet digital archive processing/access service provider application system 108, according to one example embodiment may offer example document display as an option because sometimes a user is not actually searching for anything specific in the digitized document's contents, and may just want the document's contents to be electronically displayed to enable the end user to read the entire displayed primary source digital document's contents, according to one example embodiment.

To search via example search layer 114 for example specific information, according to one example embodiment, the user 14 may according to one example embodiment select to, e.g., but not limited to, perform an example semantic search, or perform an example full text search, according to one example embodiment. Both of these example search styles of full text search and semantic search have the search style's respective merits, according to one example embodiment. Full text search, according to one example embodiment, may include, e.g., but not limited to, electronically seeking to find, within an electronically digitized document(s)' contents, e.g., but not limited to, a specific word such as "chicken" and the example system 108 may return the resulting page number, and sentence that may contain an occurrence of the specific word "chicken," according to one example embodiment. Semantic search, according to one example embodiment, may include, e.g., but not limited to, also electronically seeking to find and return example contents of the electronically digitized document, that contains the word "chicken," as well as inferences to the word chicken such as, e.g., but not limited to, "duck," "turkey," and really anything to do with the species fowl, according to one example embodiment. The full context search, according to one example embodiment, may include, e.g., but not limited to, a subset, and/or all of the search results of the semantic search, according to one example embodiment. As one can expect, more results may be electronically displayed with semantic searching than mere full text search results, according to one example embodiment.

FIG. 7 depicts an example embodiment of a flow diagram 700, according to an example embodiment. FIG. 7 may begin with 702 and may continue immediately with 704, according to one example embodiment.

In 704, flow diagram 700 may include, e.g., but not limited to, computationally processing digitized old historical documents of a historical digital archive, electronically, using artificial intelligence or machine learning (AI/ML)-based processing to enable semantic searching of a corpus of a plurality of the digitized old historical documents, according to one example embodiment. From 704, flow diagram 700 may continue with 706, according to one example embodiment.

In 706, flow diagram 700 may include, e.g., but not limited to, electronically receiving, by at least one electronic computer processor, the digitized old historical document, according to one example embodiment. From 706, flow diagram 700 may continue with 708, according to one example embodiment.

In 708, flow diagram 700 may include, e.g., but not limited to, electronically pre-processing the digitized old historical document using one or more large language models to enable electronic semantic searching, scoring searching quality, encoding retrieval augmented generation, and embedding scoring vector and object semantic data, according to one example embodiment. From 708, flow diagram 700 may continue with 710, according to one example embodiment.

In 710, flow diagram 700 may include, e.g., but not limited to, optionally, electronically enabling creating data enrichment software agent to enrich the document to make inferences, discover new history (e.g., by identifying at least one connection between a plurality of said documents in the at least one historical digital archive, etc.), or interesting historical facts, according to one example embodiment. From 710, flow diagram 700 may continue with 712, according to one example embodiment.

In 712, flow diagram 700 may include, e.g., but not limited to, optionally, electronically storing the document, scoring vector and embedded semantic object data in a database, where the database is capable of storing vector data, according to an example embodiment, or enabling receiving semantic search queries and providing search results, according to one example embodiment. From 712, flow diagram 700 may continue with 714, where flow diagram 700 may immediately end, according to one example embodiment.

FIG. 8 depicts an example block diagram 800 illustrating an example digitally scanned historical document and processed data, according to an example embodiment.

An example of full context search, according to one example embodiment, may include, e.g., but not limited to, the results depicted in the example diagram 800 of FIG. 8, which illustrates an example digitally scanned document 802, an example scanned old newspaper document, which may include an example recognized and/or machine read text 804 including in quoted portion language of the day, i.e., the language of when the original document was published, "The breed changed. By every bird and beast of prey Our chickens were conveyed away: For Britain's huge high-crested cocks. That trembled at a kite or fox, Fat, heavy, home-fed, hen-pecked, tame, Would not engage the Gallic game; Yet strutted if they up could pick, By chance, a strolling neighbour's chick. How now! Quoth Brunswick, great and good, I like not much this bastard breed: For safety of our yard of fowls, We might as well depend on owls; How can the daftards be so safe? I'll have the hawk to mend the race:" including example meter or verse, poetic rhyme or couplets, "beast of prey" and "conveyed away," "have the hawk," and "mend the race," "up could pick" and "neighbour's chick." "daftards" and "bastards." "fowls" and "owls." and example use of alternate dated spellings "neighbour." "quoth," and "daftards" illustrating use of rhyme/ poetry, couplets, and the vernacular or language of the time period of the publication of original text of the scanned document, and example document page number 806, in this case of page 0722, according to one example embodiment.

The example illustration 800 of the example full text search may, e.g., but not limited to, display on an example Internet browser-based graphical user interface, example search results, e.g., that may indicate that the word "chicken" based on use of "fowl." "chick," "cocks." "henpecked." and "chickens" was found on page 0722 of the archive, according to one example embodiment.

FIG. 9 depicts an example block diagram 900 illustrating another example scanned historical document and processed data, according to an example embodiment.

An example of semantic search, according to one example embodiment, may include, e.g., but not limited to, the results depicted in the example diagram 900 of FIG. 9, which illustrates an example digitally scanned document 902, an example scanned old newspaper document, which may include an example recognized and/or machine read text 904 including in quoted portion, "Fresh beef, mutton, and pork, four shillings a pound. Dunghill fowls, ten shillings apiece. Geese thirty shillings apiece." Including different indications of monetary prices of a time period of the document, and use of "fowls" indicating "chickens" based on a synonym recognized from the language of time of FIG. 8, and example document page number 906, in this case of page 0214, according to one example embodiment.

The example illustration 900 of the example semantic search may, e.g., but not limited to, display on an example Internet browser-based graphical user interface, example search results, such as, e.g., but not limited to, that may indicate display that fowl such as "dunghill fowl" and "geese" listed separately, suggesting dunghill fowl might be chicken, or at least a different type of bird than geese, were found on page 0214 of the archive, according to one example embodiment.

Both example search options, according to one example embodiment, may also allow the user to search the entire archive, and/or specific documents, etc., using certain terms like chicken or fowl and find other relevant synonyms or vernacular of the time period of the document, according to one example embodiment.

The semantic search, according to one example embodiment, may be further refined with the use of data enrichment 118 electronic software agents as illustrated, e.g., but not limited to, by enrichment layer 118 in diagram 100, where example data enrichment agents and/or videlicet open source application programming interface (APIs) may be included, according to one example embodiment. These example data enrichment agents of 118 may, according to one example embodiment, run in the background and/or may, according to one example embodiment, continually add metadata to the database, according to one example embodiment. The addition of example metadata enrichments and example background processing may further help tailor search results, according to one example embodiment. For example, according to one example embodiment, in the case of the example chicken search, if a user wants to search for duck, and the search results returns all fowl such as chickens, turkeys and duck, the data enrichment layer 118 agents may, e.g., but not limited to, create a separate data enrichment agent that may only return water fowl and exclude land fowl, according to one example embodiment. The data enrichment agents 118, according to one example embodiment can be open source API, according to one example embodiment.

Figure 2:
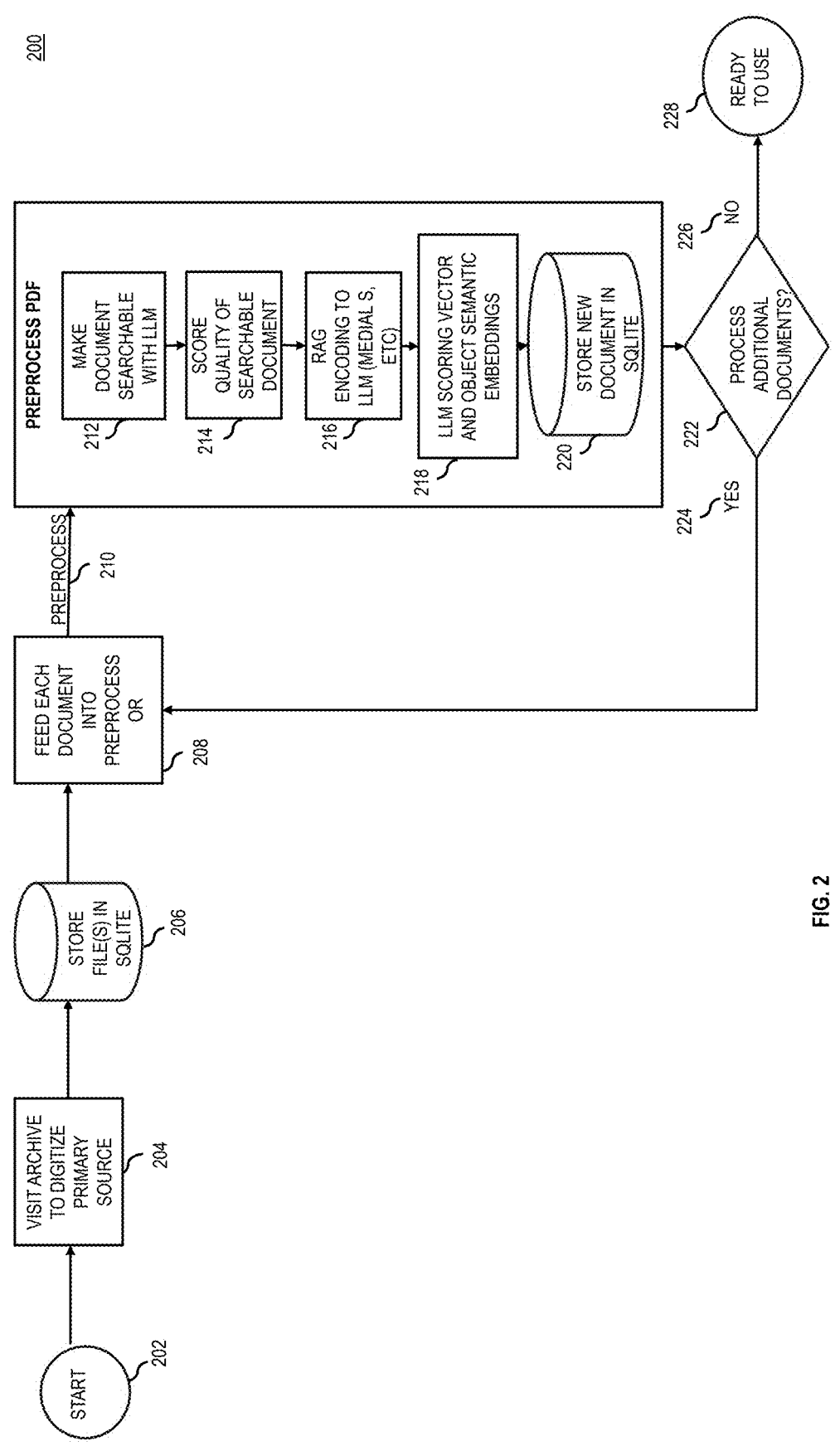
FIG. 2 depicts an example block diagram of an example preprocess engine system, according to one example embodiment.

FIG. 2 depicts an example block diagram 200 of an example preprocess engine system, according to one example embodiment.

FIG. 2 depicts an example block diagram 200 of an example preprocess engine system (Preprocess System 2), according to one example embodiment. FIG. 2, according to one example embodiment, may include, e.g., but not limited to, beginning with example 202, and in one example embodiment, 200 may immediately continue with 204.

In 204, flow diagram 200 may include, e.g., but not limited to, an example Videlicet preprocess engine 110, according to example embodiment, which may prepare the documents for storage on the example service provider 108 server, according to example embodiment. Initially, in 204, according to example embodiment, an employee 12 may, according to example embodiment, research and/or visit and/or access primary source documents that may be incorporated into an example electronically scanned digital archive, according to example embodiment. These electronically accessible documents, according to example embodiment, may be obtained from a variety of archives such as, e.g., but not limited to, the Library of Congress, etc., according to example embodiment.

In 206, according to one example embodiment, the electronically accessible documents, according to example embodiment, may be initially loaded 208, e.g., fed into preprocess 110, 210, and/or directly onto the server, such as, e.g., but not limited to, placed into an example database 116 such as, e.g., but not limited to SQLLITE 116 (such as, e.g., but not limited to, a database, such as, e.g., but not limited to, a relational database, and/or an SQL database, such as, e.g., but not limited to, a MySQL, PostgreSQL, Oracle Database, etc., relational databases that store data in tables with predefined schemae, and/or a NoSQL database, such as, e.g., but not limited to, MongoDB, Cassandra, Redis, etc., that handle unstructured or semi-structured data, etc., etc.), according to example embodiment, in a machine readable format (such as, e.g., but not limited to, portable document format (PDF), JPG, JPEG, TIFF, EPS, PNG, text, ASCII, EBCDIC, JSON, MQTT, etc., and/or any common electronic data format as will be apparent to those skilled in the relevant art, etc.), according to example embodiment.

In 220, 200 may, e.g., determine if there are additional documents to process, and if so, then may continue with 224, or otherwise according to example embodiment, may continue with 226, and may according to example embodiment, continue with 228, according to example embodiment.

In 224, according to example embodiment, then 200 may immediately continue to process at 208 and 210 the additional document, continuing the preprocessing, according to example embodiment.

In 228, according to example embodiment, then 200 may be ready to use, and users may then search against the preprocessed data to, e.g., but not limited to, display search results, and/or further process searches, according to example embodiment, and from 228, 200 may immediately end.

In 210, according to example embodiment, if the document is to be preprocessed from 208, then preprocessing 210 may then, according to example embodiment, run the documents through an example preprocessor 110 to, e.g., but not limited to, 212 the document make searchable with a large language model (LLM), e.g., index, etc., 214 score quality of the searchable document, 216 retrieval augmented generation (RAG) generative AI granting of information retrieval capabilities, encoding to the large language model (LLM) such as, e.g., but not limited to, use MEDIAL S (e.g., the S that looks like an f, the long S, a letter once used in the middle of words and looked like an f), etc., 218 compute example LLM scoring vectors and object semantic embeddings, and/or finally 220 which may store into, e.g., but not limited to, the vector database, such as, e.g., a relational database, where the database may be capable of storing vector data, the SQLLITE database 116, according to example embodiment. According to example embodiment, once the original document is transformed and stored, it may be ready for, e.g., but not limited to, the end user 14 to, e.g., but not limited to, either display as is, and/or to, e.g., but not limited to, perform a search via search layer 114, via example end user device 106, according to example embodiment.

The example scoring part 218, according to example embodiment, of the example preprocess system 110, 210 may include, according to example embodiment, running each document through a plurality of different LLMs (such as, e.g., but not limited to, OPENAI, ChatGPT, ANTHROPIC, CLAUDE, GROK, MISTRAL, PALM, FALCON, STABLE LM, GEMINI, LLAMA, MIXTRAL, JAMBA, COMMAND R, GEMMA, PHI-3, XGEN-7B, DBRX, *PYTHIA*, SORA, ALPACA 7B, NEMOTRON-4, etc.), according to example embodiment, to determine which LLM produces the highest accuracy, according to example embodiment. According to example embodiment, Applicants have found, according to example embodiment, that a sampling of documents from one archive may produce different results, according to one example embodiment.

Figure 3:
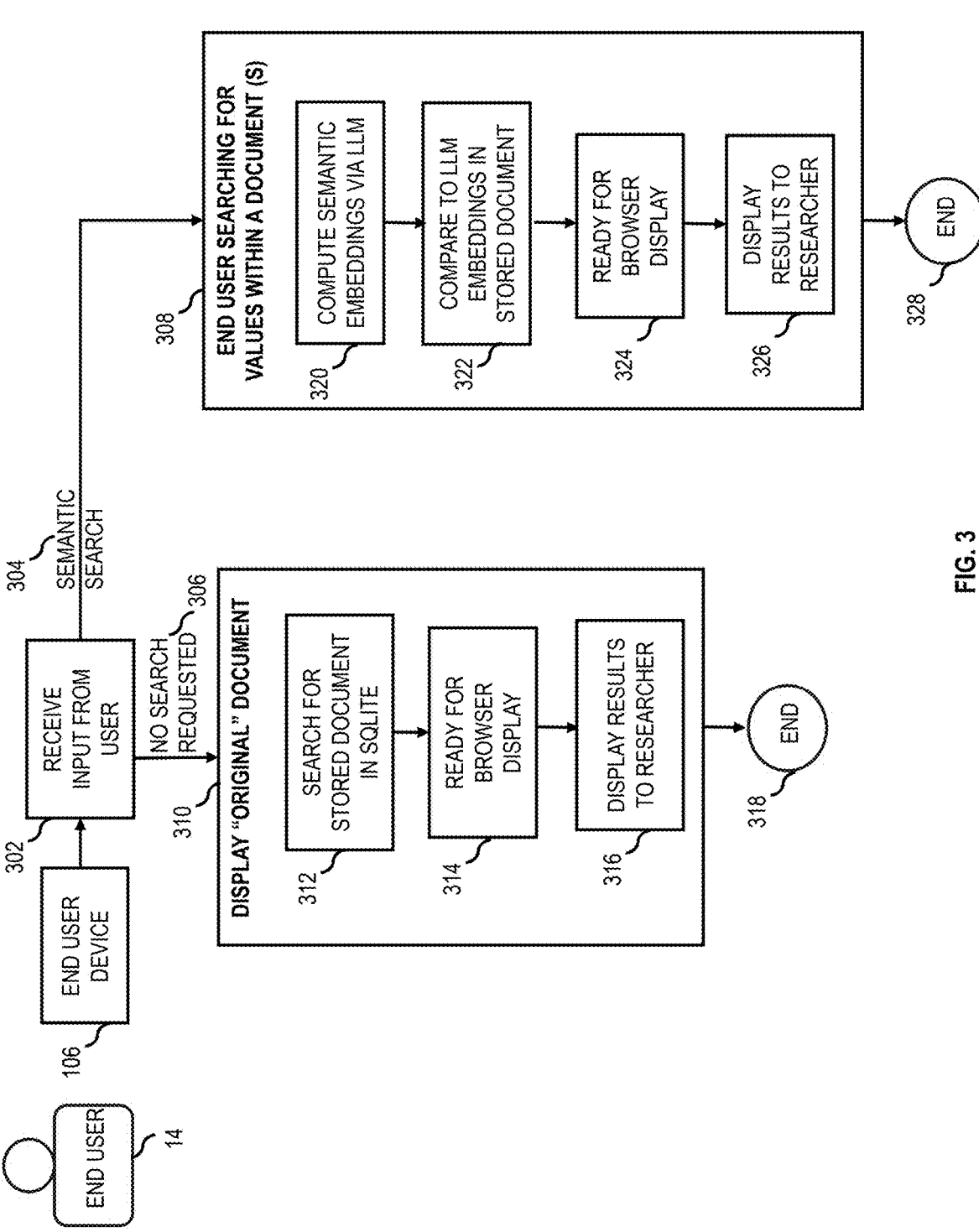
FIG. 3 depicts an example block diagram of an example search engine system, according to one example embodiment.

FIG. 3 depicts an example block diagram 300 of an example search engine system, according to one example embodiment.

FIG. 3 depicts an example block diagram 300 of an example search engine system of example Search Engine System Design 300, according to one example embodiment. FIG. 3 illustrates an example search engine 302, which may, from an end user device 106, may in 302 receive query input from the user 14, and may allow the user 14 to, e.g., but not limited to, request a semantic search 304, no search 306, and/or to display the document 310, according to an example embodiment. If no semantic search is sought 306, then a user may be presented the original document in 310, and may perform lexical, e.g., full text search of that document, if the contents of the document have been captured via OCR, etc. machine reading, and such lexical keyword searching may be performed on and in 310 the original document may be displayed, and may continue with 312, according to an example embodiment.

If a semantic search 304 is selected, then semantic search 308 may be performed, an a an end user may search for values with a document, according to one example embodiment, and according to an example embodiment, may include, e.g., but not limited to, 320, according to one embodiment.

In 312, according to example embodiment, full text search 306 may search the entire archive, or specific files within the archive for a keyword or phrase occurring in the archive, including, e.g., but not limited to, searching for a stored document in the example SQLITE 116 of FIG. 1, according to one example embodiment, and from 312, 310 may continue with 314, according to one example embodiment.

In 314, according to example embodiment, 310 may prepare the search results of the lexical search for browser display, performing any processing such as, e.g., but not limited to, formatting and/or preparing for display, according to one example embodiment, and from 314, 310 may, according to example embodiment, immediately continue with 316, according to one example embodiment.

In 316, according to example embodiment, 310 may continue by displaying search results to the user 14 such as, e.g., but not limited to, a researcher, or other user, according to an example embodiment, and from 316, 310 may, according to example embodiment, immediately continue with 318, ending, according to an example embodiment.

Thus, according to example embodiment, 310 may return the paragraph or sentence that has exactly that word or phrase in it, according to one example embodiment.

In 320, according to example embodiment, 308 may begin by computing semantic embeddings using a large language model (LLM), according to example embodiment, and from 320, according to example embodiment, 308 may, according to example embodiment, immediately continue with 322, according to example embodiment.

In 322, according to example embodiment, 308 may continue with comparing to the LLM, any embeddings previously stored in a given document, according to example embodiment, and from 322, according to example embodiment, 308 may, according to example embodiment, immediately continue with 324, according to example embodiment.

In 324, according to example embodiment, 308 may continue with readying for example browser display the results of the comparison, according to example embodiment, and from 324, according to example embodiment, 308 may, according to example embodiment, immediately continue with 326, according to example embodiment.

In 326, according to example embodiment, 308 may continue with displaying the search results to the user 14 on end user device 106, according to example embodiment, and from 326, according to example embodiment, 308 may, according to example embodiment, immediately continue with 328 and may, according to example embodiment, may end, according to example embodiment.

Semantic search, according to example embodiment, may extend the keyword search to build inferences within the search, according to one example embodiment. As shown, e.g., but not limited to, in FIG. 1, according to example embodiment, the semantic search may return results based on a species of data, according to example embodiment, rather than just the key word, according to one example embodiment. The example semantic search, according to example embodiment, may infer that the user is searching for a broader range of data and may try to build connections with the available data, according to one example embodiment. The keyword search, according to example embodiment, may be essentially a subset of the semantic search. Of course, semantic search, according to example embodiment, can be further refined with, e.g., but not limited to, software and/or data agents, according to example embodiment, which may include, those illustrated in FIG. 4, according to one example embodiment.

Figure 4:
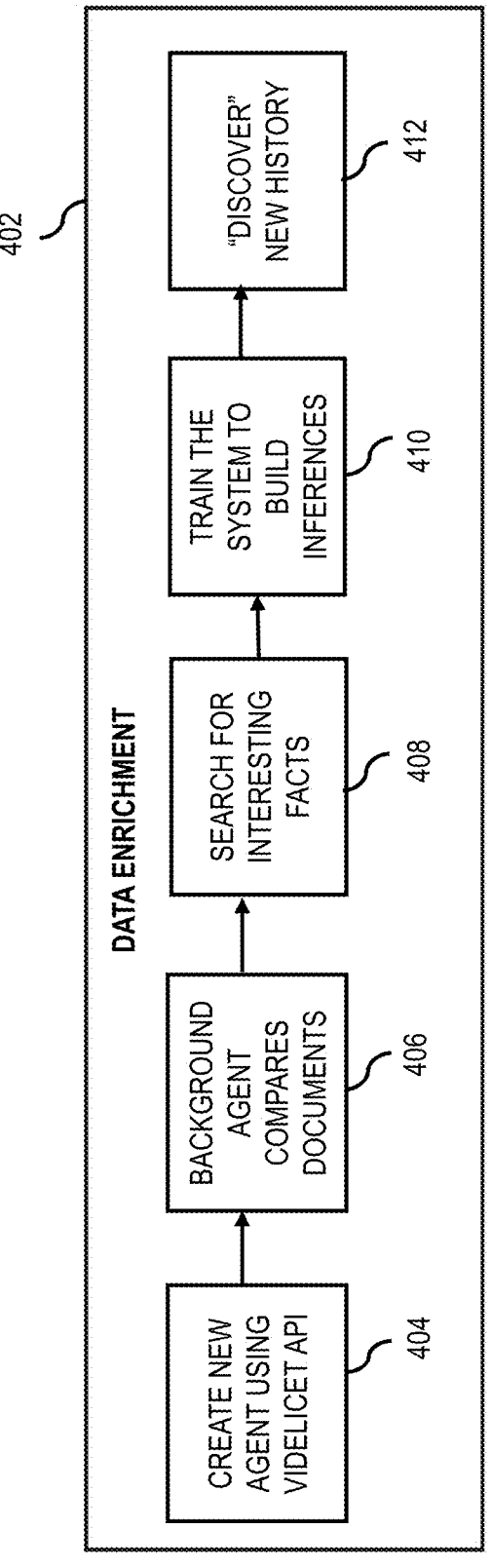
FIG. 4 depicts an example block diagram of an example data enrichment agent application programming interface (API), according to one example embodiment.

FIG. 4 depicts an example block diagram 400 of an example data enrichment agent application programming interface (API) 402 from enrichment layer 118 of FIG. 1, according to one example embodiment.

FIG. 4 depicts an example block diagram 400 of an example data enrichment agent application programming interface (API), (Data Enrichment Agent API 402), according to one example embodiment. Data enrichment 402 may include, e.g., but not limited to, a series of open source API agents 404-412, according to one example embodiment. According to one example embodiment, Data Enrichment Agent API 402 may provide some example basic agents 404-412, that may run, executing an example series of example software-based electronic computer processor-executable instructions executing on an example computer processor (or processors), to further refine the example semantic search results, according to one example embodiment. End users, according to one example embodiment, in example flow diagram element 404, can build their own custom agents, by using the example VIDELICET digital archive processing/access service provider application system Data Enrichment Agent API 402, according to one example embodiment. An example of how the agent may work, according to one example embodiment, is illustrated in FIG. 1, FIGS. 8 and 9, according to one example embodiment. For example, if doing a search on a query "chicken," the semantic search may return everything related to the species of fowl, according to one example embodiment. However, if a user is only interested in land fowl, an Agent can be written, according to one example embodiment, to set limits on the search result and may, e.g., but not limited to, only display "land fowl," according to one example embodiment.

In 404, a new agent may be created using a data enrichment API according to one example embodiment, and flow 402 may continue with 406, according to one example embodiment.

In 406, a background agent may compare documents according to one example embodiment, and flow 402 may continue with 408, according to one example embodiment.

In 408, a search for interesting facts may be performed by a data enrichment agent using a data enrichment API according to one example embodiment, and flow 402 may continue with 410, according to one example embodiment.

In 410, the system may be machine trained to build inferences using a data enrichment API according to one example embodiment, and flow 402 may continue with 412, according to one example embodiment.

In 412, new history may be discovered, according to one example embodiment, by, e.g., but not limited to, by identifying at least one connection between a plurality of said documents in the at least one historical digital archive, etc., using a data enrichment API according to one example embodiment, and once complete flow 402 may immediately end, according to one example embodiment.

FIG. 5 depicts an example embodiment of an example component level example hardware architecture 500 for an example computing device as may be used for any of various example hardware subsystem components of an example system, according to one example embodiment. FIG. 5 depicts an example embodiment of a hardware architecture block diagram 500 for an example computing or communications device as may be used for any of various example search engine related devices, preprocessing devices, date enrichment devices, as well as example computing devices of example web and application servers, user devices, mobile devices, network communication components, routers, gateways, client devices, end user devices, user devices, employee devices, database server devices, machine learning devices, LLM processing devices, AI processors, Graphics Processors, enrichment devices, comparison devices, scoring devices, data communications network devices, routers, gateways, processing nodes, cluster nodes, preprocessing devices, display devices, formatting devices, search engine devices, graphical user interface devices, machine learning devices, LLMs, transformers, searching devices, RAG devices, storage devices, database devices, relational DBMS, SQL databases, noSQL databases, encoding devices, scoring vector devices, document scanning, document machine reading, OCR devices, scanners, enrichers, metadata adding devices, embedding devices, browser devices, display devices, search devices, search result display devices, parsing, indexing, formatting devices, inference engines, agent creation devices, etc., according to an example embodiment of the present invention.

FIG. 5 depicts an exemplary schematic block diagram 500 illustrating an exemplary computer/communications device hardware architecture as may be used in various exemplary components of an exemplary embodiment including user devices various example application server, web server, client devices, user devices, end user devices, employee devices, example browser devices, researcher devices, enrichment devices, notification and/or authentication devices, client, server and/or network devices, as well as example computing devices of users, mobile devices, network communication components, routers, gateways, etc., computer device(s), digital archive devices, data enrichment devices, etc. Also embodiments of the claimed invention may further couple to third party systems for providing other functionality such as, e.g., but not limited to, access methods, authentication, payment processing devices, LLM devices, payment service provider devices, other computing or communications devices, routers, application servers, web servers, cloud-based computing devices, communication devices, switches, routers, gateways, telephone devices, mobile devices, content servers, web servers, database servers and/or other application servers, end-user devices, operations center devices, client and/or server devices, network routers, gateways, access points, and the like, according to various exemplary embodiments.

FIG. 5 depicts an exemplary schematic block diagram 500 illustrating an exemplary computer/communications device hardware architecture as may be used in various exemplary components of an exemplary embodiment including mobile devices, wearables, cloud-based computing devices, content servers, web servers, database servers and/or other application servers, according to various exemplary embodiments. Diagram 500 may include any of various exemplary computer systems as may be used as an external computer device, an internal and/or set top box (STB) or system on a chip (SOC), a mobile device, a wearable, a client, or server, web server, application server, and/or any other of the computing devices included in the other drawings, according to various exemplary embodiments. FIG. 5 depicts an exemplary diagram 500 illustrating an exemplary computer/ communications device hardware architecture as may be used in various components of exemplary embodiments of the present invention. FIG. 5 depicts an exemplary view 500 of exemplary computer systems such as those represented in FIGS. 1-2, 4, etc., including devices which may execute various modules, including components, systems, devices, computers, processors, mobile devices, routers, gateways, network devices, other computing and/or network devices, network monitoring and security operations data analysis computing devices which may execute various operating system and software components on such computing devices and/or subsystem devices and hardware/software modules as may be represented by devices implied by, or perform steps illustrated in various flowchart diagrams as illustrated in the figures by elements of FIGS. 1-6, 7, 8, 9, etc., as may be used in implementing an exemplary embodiment of the present invention. FIG. 5 depicts an exemplary embodiment of a computer system that may be used in computing devices including those shown and not shown, such as, e.g., but not limited to, service provider computing devices, LLM systems, user computing devices, database, data repository processing and/or storage computing devices, network devices, communication devices, authentication devices, notification devices, requesting device, response devices, cryptocurrency exchange related devices, NFT related devices, traditional financial services and/or fiat currency processing computing devices, electronic funds transfer (EFT) related devices, network monitoring and analysis devices of example operations illustrated example environment 400, computing devices 500, devices, servers, application servers, web servers, other wearable and/or mobile devices, sensor capture devices, routers, gateways, data network communication equipment, according to an exemplary embodiment of the present invention. FIG. 5 depicts an exemplary embodiment of a computer system that may be used as client device, a server device (not shown), a network component, router, packet monitor/analyzer, server device, storage, and/or cloud based storage device, application servers, and/or web servers, etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 500 is shown in FIG. 5, depicting an exemplary embodiment of a block diagram of an exemplary computer system useful for implementing the present invention. Specifically, FIG. 5 illustrates an example computer 500, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/7/8/10, etc. available from MICROSOFT® Corporation of Redmond, Wash., U.S.A., SOLARIS® from SUN® Microsystems of Santa Clara, Calif, U.S.A, OS/2 from IBM® Corporation of Armonk, N.Y, U.S.A, Mac/OS, Mac OSX, IOS, from APPLE® Corporation of Cupertino, Calif, U.S.A, etc., or any of various versions of UNIX® (a trademark of the Open Group of San Francisco, Calif, USA) including, e.g., LINUX®, UBUNTU, HPUX®, IBM AIX®, and SCO/UNIX®, etc., ANDROID, Android OS is available from Google, JAVA from Oracle, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 500 is shown in FIG. 5. Other components of the invention, such as, e.g., (but not limited to) a computing device, a browser-based client, an internet browser, a mobile device, a smartphone device, a server device, a webserver device, an application server device, a historical data archive device, an LLM, a data communications device, a network device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, a tablet, a phone, a mobile phone, a cellular phone, a communications device, an iPhone, iOS, a smartphone, an iPad, a tablet based device, an ANDROID OS device, an iOS device, a Symbian based device, a Windows 8, 10, 11, etc., device, etc., may also be implemented using a computer such as that shown in FIG. 5.

The computer system 500 may include one or more processors, such as, e.g., but not limited to, processor(s) 504, which may include microprocessors, coprocessors, nanoprocessors, microcontrollers, systems on a chip (SOC), multiprocessor systems, parallel processors, CISC type processors, RISC type processors, POWER type processors, ARM-architecture processors, massively parallel processor, graphic processors (GPUs) 532, cryptographic processors such as, e.g., but not limited to, encryption/decryption processor 536, quantum computers, QuBit, etc. The processor(s) 504 may be connected to a communication infrastructure 506 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 500 may include a display interface 502 that may forward, e.g., but not limited to, graphics, text, and other data, etc., from the communication infrastructure 506 (or from a frame buffer, etc., not shown) for display on the display unit 530, and/or GPU 532, and/or touchscreen 534, and/or other input or output, and/or input and output device, sensor-based device, etc.

The computer system 500 may also include, e.g., but may not be limited to, a main memory 508, random access memory (RAM), and a secondary memory 510, etc. The secondary memory 510 may include, for example, (but not limited to) a hard disk drive 512 and/or a removable storage drive2 514, representing a floppy diskette drive, a magnetic tape drive, an optical disk drive, a compact disk drive CD-ROM, DVD, Personal Cloud storage, redundant array of inexpensive disks (RAID) array, etc. The removable storage drive 514 may, e.g., but not limited to, read from and/or write to a removable storage unit 518 in a well-known manner. Removable storage unit 518, also called a program storage device or a computer program product, may represent, e.g., but not limited to, a floppy disk, magnetic tape, optical disk, compact disk, etc. which may be read from and written to by removable storage drive2 514. As will be appreciated, the removable storage unit 518 may include a computer usable storage medium having stored therein computer software and/or data.

In alternative exemplary embodiments, secondary memory 510 may include other similar devices for allowing computer programs or other instructions to be loaded into computer system 500. Such devices may include, for example, but not limited to, a removable storage unit 522 and an interface 520. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, FLASH memory, application specific integrated circuits (ASICs), field programmable gate arrays (FPGAs), and/or other removable storage units 522 and interfaces 520, which may allow software and/or data to be transferred from the removable storage unit 522 to computer system 500.

The computing device 500 may also include a cloud-accessible or cloud-based processing and/or storage solution as may be available from Amazon Web Services available from Amazon of Seattle, WA USA, or Azure cloud available from Microsoft Corporation of Redmond, WA USA, or Google Cloud Service available from Google of Alphabet Corporation, Mountain View, CA USA, among many other network and software communications offerings available from IBM Corporation, Oracle Corporation, and others.

Computer 500 may also include an input device such as, e.g., (but not limited to) a mouse or other pointing device such as a digitizer, touch-based sensor, and/or a keyboard and/or other data entry device (none of which are labeled).

Computer 500 may also include output devices, such as, e.g., (but not limited to) display 530, and display interface 502. Computer 500 may include input/output (I/O) devices such as, e.g., (but not limited to) communications interface 524, cable 528 and communications path 526, etc. These devices may include, e.g., but not limited to, a network interface card, and modems (neither are labeled). Communications interface 524 may allow software and data to be transferred between computer system 500 and external devices. Examples of communications interface 524 may include, e.g., but may not be limited to, a modem, a network interface (such as, e.g., an Ethernet card), a communications port, a Personal Computer Memory Card International Association (PCMCIA) slot and card, etc. Software and data transferred via communications interface 524 may be in the form of signals 528 which may be electronic, electromagnetic, optical or other signals capable of being received by communications interface 524. These signals 528 may be provided to communications interface 524 via, e.g., but not limited to, a communications path 526 (e.g., but not limited to, a channel). This channel 526 may carry signals 528, which may include, e.g., but not limited to, propagated signals, which may be stored in nontransitory form, and may be implemented using, e.g., but not limited to, wire or cable, local and/or wide area network (LAN/WAN) protocols, Ethernet, Token Ring, FDDI, carried over and of various physical media, fiber optics, a telephone line, twisted pair, shielded twisted pair, a cellular link, a radio frequency (RF) link, wireless communications, spread spectrum, orthogonal frequency division multiplexing (OFDM), and/or other communications channels, communications networks, wireless networks, cellular, wired, and other types of terrestrial and/or satellite based networks, whether in GEO, LEO, or any other orbit, and personal area, wireless fidelity (WIFI), local area (LAN), wide area (WAN, WIMAX, etc.), proximity area networks, BLUETOOTH, WIFI, etc.

In this document, the terms "computer program medium" and "computer readable medium" may be used to generally refer to media such as, e.g., but not limited to removable storage drive 514, a hard disk installed in hard disk drive 512, and signals 528, etc. These computer program products may provide software to computer system 500. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct or indirect physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such s as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device modified as set forth herein to perform the processing as described to be selectively activated or reconfigured by a software program stored in the device to become a special purpose device capable of performing the subsystem's or submodule's performance functionality and computer and communications systems instructions, and/or by hardware processing such as, e.g., but not limited to, performing certain trusted platform system processing, including exemplary key based encryption/decryption, network monitoring, packet inspection and the like, according to exemplary embodiments. Some embodiments may be represented by, and/or implemented as example state machines, and may pass from one state to another.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.) when nontransitory, and others.

Computer programs (also called computer control logic), may include object-oriented computer programs, and may be stored in main memory 508 and/or the secondary memory 510 and/or removable storage units 514, also called computer program products. Such computer programs, when executed, may enable the computer system 500 to perform the features of the present invention as discussed herein. In particular, the computer programs, when executed, may enable the processor 504 to provide a method to resolve conflicts during data synchronization according to an exemplary embodiment of the present invention. Accordingly, such computer programs may represent controllers of the computer system 500.

Various artificial intelligence based analysis techniques may be used herein including neural networks, machine learning, any of various well-known AI and ML techniques and processes (e.g., reinforcement learning, dynamic programming, state action reward state action (SARSA), q learning, supervised learning, unsupervised learning, large language models (LLMs), natural language search and interactive request and response, neural networks, convolutional neural networks, statistical heuristics, topic identification and classification, linguistics and semantic processing, Trademarked software TensorFlow and OpenAI libraries, cloud computing services, specific APIs, Microsoft cognitive services, Google cloud AI, Watson AI, offerings from Amazon, Facebook, Baidu, Apple, and others, etc.), and output of such algorithms may be analyzed further as set forth herein to obtain feature vectors and other data which may be used to provide further guidance to users, and/or be integrated for further processing and analysis, authentication, access control, and/or encryption/decryption processing, and coupled via decision support systems, executive information systems, and other graphical user interface enabled network and cyber security monitoring and threat analysis management and processing.

In another exemplary embodiment, the invention may be directed to a computer program product may include a computer readable medium having control logic (computer software) stored therein. The control logic, when executed by the processor 504, may cause the processor 504 to perform the functions of the invention as described herein. In another exemplary embodiment where the invention may be implemented using software, the software may be stored in a computer program product and loaded into computer system 500 using, e.g., but not limited to, removable storage drive 514, hard drive 512 or communications interface 524, etc. The control logic (software), when executed by the processor 504, may cause the processor 504 to perform the functions of the invention as described herein. The computer software may run as a standalone software application program running atop an operating system or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Various artificial intelligence based analysis techniques may be used herein including neural networks, machine learning, any of various well-known AI and ML techniques and processes (e.g., reinforcement learning, dynamic programming, meta-learning, state action reward state action (SARSA), q learning, supervised learning, unsupervised learning, tensorflow and openAI libraries, cloud computing services, specific APIs, Microsoft cognitive services, Google cloud AI, Watson AI, Large Language Models (LLMs), OpenAI, ChatGPT, offerings from Microsoft, Bing, Google, Bard, Amazon, Facebook, Baidu, Apple, and others, etc.), and output of such algorithms may be analyzed further as set forth herein to obtain feature vectors and other data which may be used to provide further guidance to users via data archive analysis and searching tools, machine learning inference based tools, decision support systems, executive information systems, and other graphical user interface enabled automation systems, service provider support computer systems, network monitoring, cyber security monitoring, IT support systems, and processing.

Example Database, Example Vector Capable Database, Example Vector Database

According to one example embodiment, a database may be used which is capable of storing vector data, in one example embodiment, a vector capable database may include a relational database, which may be capable of storing vector data, according to one example embodiment. According to another example embodiment, the database may be other than a relational database. According to yet another example embodiment, the database may include an example vector database, vector store or vector search engine is a database that can store vectors (fixed-length lists of numbers) along with other data items. Vector databases, according to one example embodiment may include a database which may implement one or more Approximate Nearest Neighbor algorithms, so that a user can search the database with a query vector to retrieve the closest matching database records, according to one example embodiment.

Vectors, according to one example embodiment, may include mathematical representations of data in a high- or multi-dimensional space, according to one example embodiment. In this multi-dimensional space, each dimension may correspond to a feature of the data, with the number of dimensions ranging from a few hundred to tens of thousands, depending on the complexity of the data being represented, according to one example embodiment. A vector's position in this space, according to one example embodiment, may represent the vector's characteristics, according to one example embodiment. Words, phrases, or entire documents, as well as images, audio, and other types of data, can all be vectorized, according to one example embodiment.

These feature vectors, according to one example embodiment, may be computed from raw data using machine learning methods such as feature extraction algorithms, word embeddings or deep learning networks, according to one example embodiment. A goal, according to one example embodiment, may be to determine semantically similar data items which may receive feature vectors close to each other.

Vector capable databases, according to one example embodiment can be used for similarity search, semantic search, multi-modal search, recommendations engines, large language models (LLMs), object detection, etc., according to one example embodiment Vector capable databases, according to one example embodiment, may also often used to implement retrieval-augmented generation (RAG), a method, which may improve domain-specific responses of large language models, according to one example embodiment. The retrieval component of a RAG can be any search system, according to one example embodiment, but is most often implemented as a vector database, according to one example embodiment. Text documents, according to one example embodiment, may describe a domain of interest and may be collected, and for each document or document section, a feature vector (known as an "embedding") may be computed, typically using a deep learning network, and stored in an example vector capable database, according to one example embodiment. Given a user prompt, according to one example embodiment, the feature vector of the prompt may be computed, and the vector capable database, according to one example embodiment, may be queried to retrieve the most relevant documents, according to one example embodiment. The most relevant documents may then be automatically added into a context window of the large language model, and the large language model may proceed to create a response to the prompt given this context, according to one example embodiment.

Example techniques, according to one example embodiment, for similarity search on multi- or high-dimensional vectors may include, e.g., but not limited to: Hierarchical Navigable Small World (HNSW) graphs, Locality-sensitive Hashing (LSH) and Sketching, Product Quantization (PQ), Inverted Files, and/or combinations of these techniques, according to one example embodiment. According to one example embodiment, HNSW-based implementations may be used. Example conferences such as, e.g., but not limited to, the International Conference on Similarity Search and Applications (SISAP), and the Conference on Neural Information Processing Systems (NeurIPS) host example competitions, according to one example embodiment, on vector search in large databases and may also be used in other example embodiments, according to one example embodiment.

Example vector capable databases, according to one example embodiment, may include, e.g., but not limited to, Aerospike, AllegroGraph, Apache Cassandra, Chroma, Azure Cosmos DB, Couchbase, CrateDB, DataStax, Elasticsearch, HDF5 Query Indexing, LanceDB, Lantern, LlamaIndex, MariaDB, Marqo, Meilisearch, Milvus, MongoDB Atlas, Neo4j, ObjectBox, OpenSearch, Oracle Database, Pinecone, Postgres with pgvector, Qdrant, Redis Stack, Snowflake, SurrealDB, Typesense, *Vespa*, Weaviate, among many others including relational and nonrelational databases, etc., according to various example and nonlimiting embodiments, according to an example embodiment.

Example Machine Learning Algorithms

Various example embodiments may use artificial intelligence and machine learning techniques. According to one example embodiment, a scikit-learn, open source machine learning library for the Python programming language, may be used to develop a classification supervised machine learning algorithm. Example algorithms may include Random Forest, k-Nearest Neighbors, Convolutional Neural Networks, Quadratic Discriminant Analysis, Logistic Regression, Gradient Boosted Decision Trees, Ada Boost, Naïve Bayes Classifiers and Support Vector Machines, and various other techniques such as, e.g., but not limited to, a supervised learning method, an unsupervised learning method, or a reinforcement learning method, linear regression, logistic regression, decision tree, support vector machine (SVM), naive bayes, k-nearest neighbors (kNN), k-means clustering, random forest, dimensionality reduction, or gradient boosting algorithm.

Convolutional Neural Networks

Neural networks are a subset of machine learning, at the heart of deep learning algorithms. NNs are comprised of node layers, containing an input layer, one or more hidden layers, and an output layer. Each node connects to another and has an associated weight and threshold. If the output of any individual node is above the specified threshold value, that node is activated, sending data to the next layer of the network. Otherwise, no data is passed along to the next layer of the network.

While feedforward networks are described generally herein, there are various types of neural nets, which are used for different use cases and data types, and may also be used in alternative embodiments. For example, recurrent neural networks are commonly used for natural language processing and speech recognition, whereas convolutional neural networks (also known as ConvNets or CNNs) are more often utilized for classification and computer vision tasks. Prior to CNNs, manual, time-consuming feature extraction methods were used to identify objects in images. However, convolutional neural networks may provide a more scalable approach to image classification and object recognition tasks, leveraging principles from linear algebra, as discussed herein, e.g., matrix multiplication, to identify patterns within an image or frame of a video. CNNs can be computationally demanding, requiring graphical processing units (GPUs) to train models, among other high performance processing solutions, such as cloud-based processing and the like.

Fukushima and LeCun performed early research around convolutional neural networks and published Backpropagation Applied to Handwritten Zip Code Recognition in the 1980s, successfully applying backpropagation to train neural networks to identify and recognize patterns within a series of handwritten zip codes. LeNet-5, in the 1990s applied the research to document recognition. Since then, various CNN architectures have emerged with the new datasets, such as MNIST and CIFAR-10, and competitions, like ImageNet Large Scale Visual Recognition Challenge (ILSVRC). Some of these other architectures include: AlexNet; VGGNet; GoogLeNet; ResNet; ZFNet; and LeNet-5.

According to an exemplary embodiment, the application system can include an electronic decision support system (DSS) (not shown), policy-based trust platform systems, which can interact, e.g., but not limited to, with computer database management system (DBMS) 507, and/or electronic interactive, graphical user interface (GUI) system.

Each of the exemplary DSS, DBMS and/or EIGUI system, can then, using e.g., but not limited to, a cryptographic processor and/or a crypto chip controller processor 536, or the like, can then encrypt the data using electronic encryptor, which can make use of one or more cryptographic algorithm electronic logic, which can include encryption code, a cryptographic combiner, etc., and may be stored in encrypted form, according to an exemplary embodiment, in a computer database storage facility, from computer database storage device, and from there the process can continue with use of the cryptographic algorithm electronic logic, and electronic decryptor, which can decrypt and/or provide a process for decrypting encrypted data, and/or by providing such data to the DSS, the DBMS, or the EIGUI, if authorized. By using encryption/decryption, certain algorithms can be used, as described herein, including, e.g., but not limited to, checksum, AES encryption, RSA, PKI, TLS, FTPS, SFTP, etc. and/or other cryptographic algorithms and/or protocols, according to exemplary embodiments.

Cryptographic Functions

Cryptographic systems, according to an exemplary embodiment, can provide one or more of the following four example services. It is important to distinguish between these, as some algorithms are more suited to particular tasks, but not to others. To protect patient data, personal data can be encrypted prior to storage and can be decrypted before accessing the data, according to an exemplary embodiment. When analyzing requirements and risks, one needs to decide which of the four functions should be used to protect the proprietary data, according to an exemplary embodiment.

Authentication

Using a cryptographic system, according to an exemplary embodiment, one can establish the identity of a remote user (or system). A typical example is the SSL certificate of a web server providing proof to the user device that user device is connected to the correct server, according to an exemplary embodiment.

The identity is not of the user, but of the cryptographic key of the user. Having a less secure key lowers the trust one can place on the identity, according to an exemplary embodiment.

Non-Repudiation

The concept of non-repudiation is particularly important for financial or e-commerce applications, according to an exemplary embodiment. Often, cryptographic tools are required to prove that a unique user has made a transaction request, according to an exemplary embodiment. It must not be possible for the user to refute his or her actions, according to an exemplary embodiment.

For example, a customer can request a transfer of money from her account to be paid to another account, according to an exemplary embodiment. Later, she claims never to have made the request and demands the money be refunded to the account. If one has non-repudiation through cryptography, one can prove-usually through digitally signing the transaction request, that the user authorized the transaction.

Confidentiality

More commonly, the biggest concern can be to keep information private, according to an exemplary embodiment. Cryptographic systems, according to an exemplary embodiment, have been developed to function in this capacity. Whether it be passwords sent during a log on process, or storing confidential proprietary financial data in a database, encryption can assure that only users who have access to the appropriate key can get access to the proprietary data.

Integrity

One can use cryptography, according to an exemplary embodiment, to provide a means to ensure data is not viewed or altered during storage or transmission. Cryptographic hashes for example, can safeguard data by providing a secure checksum, according to an exemplary embodiment.

Cryptographic Algorithms

Various types of cryptographic systems exist that have different strengths and weaknesses, according to an exemplary embodiment. Typically, the exemplary cryptographic systems can be divided into two classes; 1) those that are strong, but slow to run, and 2) those that are quick, but less secure. Most often a combination of the two approaches can be used, according to an exemplary embodiment (e.g.: secure socket layer (SSL)), whereby we establish the connection with a secure algorithm, and then if successful, encrypt the actual transmission with the weaker, but much faster algorithm.

Symmetric Cryptography

Symmetric Cryptography, according to an exemplary embodiment, is the most traditional form of cryptography. In a symmetric cryptosystem, the involved parties share a common secret (password, pass phrase, or key), according to an exemplary embodiment. Data can be encrypted and decrypted using the same key, according to an exemplary embodiment. These symmetric cryptography algorithms tend to be comparatively fast, but the algorithms cannot be used unless the involved parties have already exchanged keys, according to an exemplary embodiment. Any party possessing a specific key can create encrypted messages using that key as well as decrypt any messages encrypted with the key, according to an exemplary embodiment. In systems involving a number of users who each need to set up independent, secure communication channels, symmetric cryptosystems can have practical limitations due to the requirement to securely distribute and manage large numbers of keys, according to an exemplary embodiment.

Common examples of symmetric algorithms include, e.g., but not limited to, DES, 3DES and/or AES, etc. The 56-bit keys used in DES are short enough to be easily brute-forced by modern hardware and DES should no longer be used, according to an exemplary embodiment. Triple DES (or 3DES) uses the same algorithm, applied three times with different keys giving it an effective key length of 128 bits, according to an exemplary embodiment. Due to the problems using the DES algorithm, the United States National Institute of Standards and Technology (NIST) hosted a selection process for a new algorithm. The winning algorithm was Rijndael and the associated cryptosystem is now known as the Advanced Encryption Standard or AES, according to an exemplary embodiment. For most applications 3DES, according to an exemplary embodiment, is acceptably secure at the current time, but for most new applications it is advisable to use AES, according to an exemplary embodiment.

Asymmetric Cryptography (also called Public/Private Key Cryptography)

Asymmetric algorithms, according to an exemplary embodiment, use two keys, one to encrypt the data, and either key to decrypt. These inter-dependent keys are generated together, according to an exemplary embodiment. One key is labeled the Public key and is distributed freely, according to an exemplary embodiment. The other key is labeled the Private Key and must be kept hidden, according to an exemplary embodiment. Often referred to as Public/

Private Key Cryptography, these cryptosystems can provide a number of different functions depending on how they are used, according to an exemplary embodiment.

The most common usage of asymmetric cryptography is to send messages with a guarantee of confidentiality, according to an exemplary embodiment. If User A wanted to send a message to User B, User A would get access to User B's publicly available Public Key, according to an exemplary embodiment. The message is then encrypted with this key and sent to User B, according to an exemplary embodiment. Because of the cryptosystem's property that messages encoded with the Public Key of User B can only be decrypted with User B's Private Key, only User B can read the message, according to an exemplary embodiment.

Another usage scenario is one where User A wants to send User B a message and wants User B to have a guarantee that the message was sent by User A, according to an exemplary embodiment. In order to accomplish this, User A can encrypt the message with their Private Key, according to an exemplary embodiment. The message can then only be decrypted using User A's Public Key, according to an exemplary embodiment. This can guarantee that User A created the message because User A is then the only entity who had access to the Private Key required to create a message that can be decrypted by User A's Public Key, according to an exemplary embodiment. This is essentially a digital signature guaranteeing that the message was created by User A, according to an exemplary embodiment.

A Certificate Authority (CA), whose public certificates are installed with browsers or otherwise commonly available, may also digitally sign public keys or certificates, according to an exemplary embodiment. One can authenticate remote systems or users via a mutual trust of an issuing CA, according to an exemplary embodiment. One can trust their 'root' certificates, according to an exemplary embodiment, which in turn authenticates the public certificate presented by the server.

PGP and SSL are prime examples of systems implementing asymmetric cryptography, using RSA and/or other algorithms, according to an exemplary embodiment.

Hashes

Hash functions, according to an exemplary embodiment, take some data of an arbitrary length (and possibly a key or password) and generate a fixed-length hash based on this input. Hash functions used in cryptography have the property that it can be easy to calculate the hash, but difficult or impossible to re-generate the original input if only the hash value is known, according to an exemplary embodiment. In addition, hash functions useful for cryptography have the property that it is difficult to craft an initial input such that the hash will match a specific desired value, according to an exemplary embodiment.

MD5 and SHA-1 are common hashing algorithms, according to an exemplary embodiment. These algorithms are considered weak and are likely to be replaced in due time after a process similar to the AES selection, according to an exemplary embodiment. New applications should consider using SHA-256 instead of these weaker algorithms, according to an exemplary embodiment.

Key Exchange Algorithms

There are also key exchange algorithms (such as Diffie-Hellman for SSL), according to an exemplary embodiment. These key exchange algorithms can allow use to safely exchange encryption keys with an unknown party, according to an exemplary embodiment.

Algorithm Selection

As modern cryptography relies on being computationally expensive to break, according to an exemplary embodiment, specific standards can be set for key sizes that can provide assurance that with today's technology and understanding, it will take too long to decrypt a message by attempting all possible keys, according to an exemplary embodiment.

Therefore, we need to ensure that both the algorithm and the key size are taken into account when selecting an algorithm, according to an exemplary embodiment.

Figure 6:
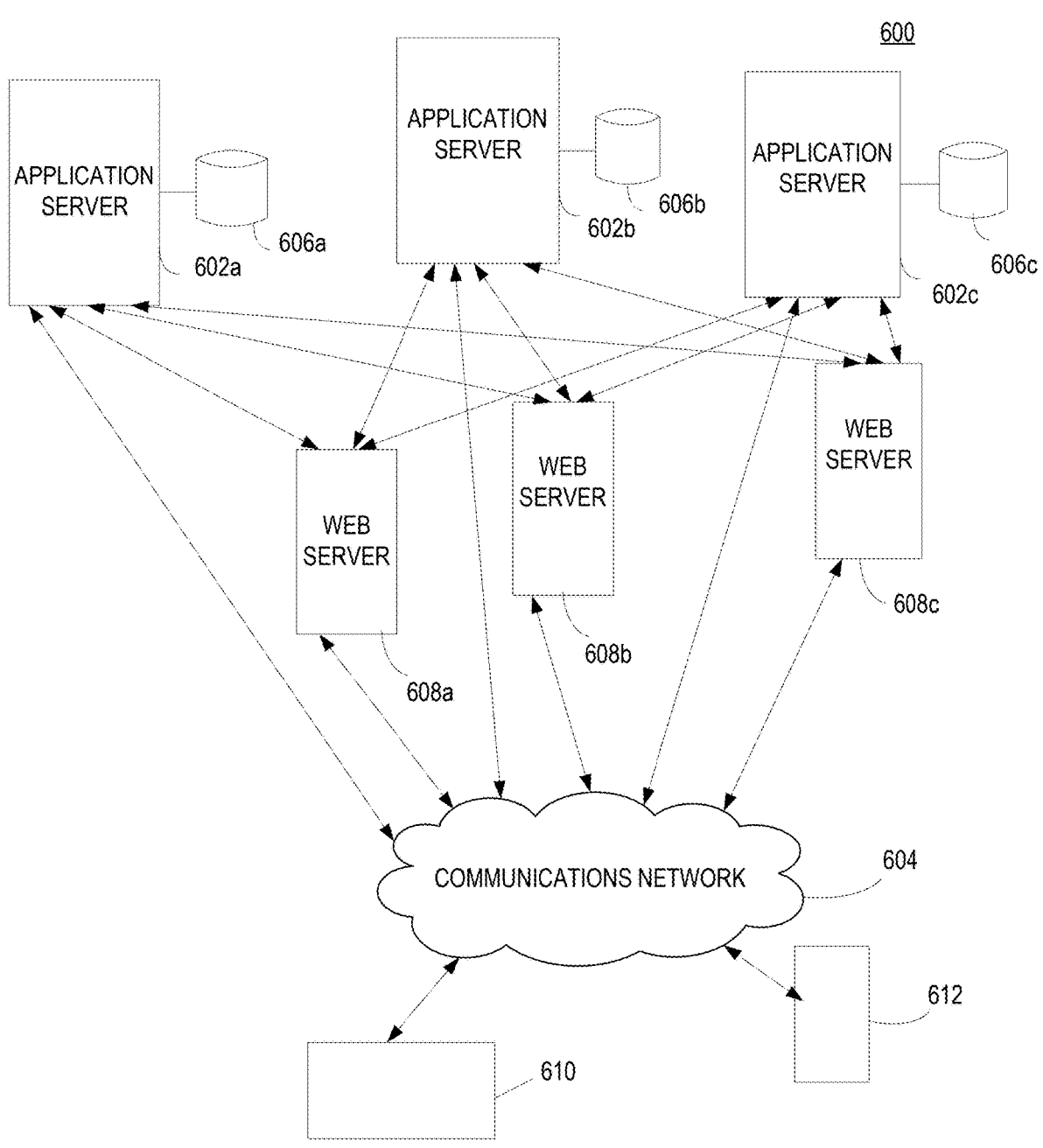
FIG. 6 depicts an example embodiment illustrating an example system level hardware architecture for an example application server, and web server embodiment of an example service provider system for providing an example software architecture of various example subsystem components of an example networking system, which may be used to implement, according to one example embodiment.

FIG. 6 depicts an example embodiment illustrating an example system level hardware architecture for an example application server, and web server embodiment of an example service provider system for providing an example software architecture of various example subsystem components of an example networking system, which may be used to implement, according to one example embodiment.

FIG. 6 depicts an example application server and web server network architecture including an example fully meshed, redundant communications network load balancing application server architecture as may be used for an example system service provider and may couple, e.g., but not limited to, employee, and end user client devices such as, e.g., but not limited to, service provider, devices from the other figures, server devices, web devices, networking devices, artificial intelligence, machine learning, and/or large language model systems and devices, blockchain, nonfungible token (NFT) systems, data repository systems, authentication systems, ledger tracking systems, blockchain distributed ledger systems, NFT systems, account access and authentication systems, notification systems, billing systems, data preprocessing systems, metadata systems, data enrichment systems, search engine systems, semantic search systems, Boolean search systems, parsing systems, lexical search systems, keyword search systems, specific technology trained search systems, query systems, search response to query systems, etc. to example service devices using an example, but nonlimiting network infrastructure, according to an example embodiment of the present invention. FIG. 6 depicts an exemplary schematic block diagram 600 illustrating an exemplary communications network device hardware architecture 600 showing exemplary network devices including exemplary application server devices 602, exemplary storage devices 606, web server devices 608, all coupled to an exemplary communications network 604, which may be coupled to other devices such as, e.g., but not limited to, a cyber security network security operations environment device or devices 604, and other end user and other internal and/or external user computing and/or communications devices 610, which may be coupled to the network communications environment 604 by one or more physical devices not shown, such as, e.g., but not limited to, network interface cards (NICs), wireless local area network WLAN or wireless fidelity (WI-FI) (IEEE 802.11 communication technologies), physical wires, twisted pair, coaxial cable, fiber optic cable, and/or other communications network cabling, wireless communication access points and/or wireless antennae, wires, wireless media, routers, gateways, access points, exchange carrier facilities, modulator/demodulator (modems), modulating equipment, cellular network exchange devices, etc. Block diagram 600 may serve as an exemplary logical diagram of associated physical devices. Physical devices may communicate via one or more communications network software protocols via exemplary protocol languages or stacks which may correlate to the Open Systems Interconnect (OSI) stack of communication layers, such as, e.g., but not limited to, Internet Protocol (IP), transmission control protocol (TCP), among various other protocols including, e.g., but not limited to, TCP/IP protocols, UDP, hypertext transfer protocol (HTTP), file transfer protocol (FTP), security protocols (e.g., HTTPS, SFTP, FTPS, TLS, etc.), as will be apparent to those skilled in the relevant art. Various load sharing devices and port sharing devices may be used, as well as protocol tracing and packet tracing devices, which may be able to access such communications data and perform exemplary processing including packet inspection, deep packet inspection, network tracing, packet inspection (e.g., source and destination address, etc.) and the like. Such systems may be used to perform various blockchain related distributed ledger technologies so as to replicate data which may be encrypted and decrypted using various algorithms. Certain algorithms may be used which may be resilient to conventional decryption techniques, resilient to brute force attack decryption techniques, and/or may be resilient to quantum computing based decryption techniques. Such software and hardware network analysis and/or processing tools may be used to process communications network traffic internal to, and/or external from an exemplary entity organization and an exemplary network operations center (NOC) network monitoring organization may be able to analyze such network traffic to, e.g., process different types of traffic, using various sophisticated network operations tools and techniques as well as to perform various automated processing as described further herein.

Although example embodiments of the invention are illustrated and described herein as embodied in an example client server, web server/application server environment, the invention should not be limited to the details shown in those example embodiments because various modifications and structural changes may be made without departing from the spirit of the invention while remaining within the scope and range of equivalents of the claims.

The construction and method of operation of various example embodiments of the claimed invention and additional features and/or advantages of various example embodiments of the invention are best understood from the following description of specific example embodiments when read in connection with the accompanying drawings.

Various exemplary embodiments of the invention are discussed in detail herein. While specific exemplary embodiments are discussed herein, it should be understood that this is done for illustration purposes only. A person skilled in the relevant art will recognize that other components and configurations can be used without parting from the spirit and scope of the invention.

What is claimed is:

1. A computer implemented method of electronically_processing at least one electronic document from at least one electronic historical digital archive_corpus_and electronically enabling electronic semantic searching of the at least one electronic document, the method comprising:

electronically pre-processing, by at least one electronic computer processor, the at least one electronic_document from the at least one electronic historical digital archive corpus, said electronically pre-processing comprising:

electronically machine transforming or machine reading identification of contents ("electronic transforming"), by the at least one electronic computer processor, the at least one electronic document comprising:

electronically machine transforming or machine reading identification of contents of the at least one electronic document, by the at least one computer processor, using at least one electronic prompt electronically received from at least one graphical user interface (GUI) to at least one electronic large language model (LLM), and electronically obtaining from the at least one electronic LLM, by the at least one electronic computer processor, electronically creating embeddings for the at least one electronic LLM, and at least one electronically transformed document based on said at least one electronic prompt; and electronically storing, by the at least one electronic computer processor, the at least one electronically transformed document and electronically created embeddings in at least one electronic database;

electronically evaluating or electronically determining accuracy, by the at least one electronic computer processor, of electronic data indicative of an electronic score quality of the at least one electronically transformed document, comprising:

electronically comparing, by the at least one electronic computer processor, said electronic data indicative of said electronic score quality of the at least one electronically transformed document, to electronic data indicative of an electronic score quality of a user reading manual visual review of identification of the contents transformation ("user transforming") of the electronic document; and electronically modifying, iteratively, by the at least one electronic computer processor, said at least one electronic prompt in order to vary said electronic score quality of the at least one electronically transformed document of said electronically evaluating;

electronically adding at least one electronic metadata, by the at least one electronic computer processor, to the electronically created embeddings in the at least one electronic database, wherein the at least one electronic database comprises:

at least a vector-enabled portion comprising:
electronic data indicative of at least one search vector data;

electronically enriching, by the at least one electronic computer processor, the at least one electronic database, after the electronically transforming, comprising at least one or more of:

electronically adding, by the at least one electronic computer processor, electronic data indicative of at least one metadata enrichment to the at least one electronic database;

electronically processing, by the at least one electronic computer processor, at least one electronically received prompt, with respect to the at least one electronically transformed document, comprising:

electronically enriching, by the at least one electronic computer processor, the at least one electronically transformed document, with at least one language of the day enrichment of the at least one electronically transformed document; or electronically creating, by the at least one electronic computer processor, at least one separate electronic data enrichment agent comprising:

electronically returning, by the at least one electronic computer processor, a subset of data;

electronically excluding, by the at least one electronic computer processor, another subset of data; and electronically adding, by the at least one electronic computer processor, metadata; and electronically enabling, by the at least one electronic computer processor, the semantic searching of the at least one electronically transformed document based on said electronically enriching, and electronically providing, by at least one electronic computer processor, the at least one graphical user interface (GUI) to provide interactive user access.

2. The method according to claim 1, wherein said electronically pre-processing comprises at least one or more of:

electronically retrieving, by the at least one electronic computer processor, the at least one electronic document from the at least one electronic historical digital archive; or electronically storing, by the at least one electronic computer processor, the at least one electronic document in at least one database, wherein said at least one database is capable of storing vector data.

3. The method according to claim 1, wherein said electronically pre-processing comprises at least one or more of:

electronically enabling, by the at least one electronic computer processor, searching of the at least one electronic document via at least one large language model (LLM);

electronically scoring, by the at least one electronic computer processor, searching quality of the at least one electronic document to obtain at least one LLM scoring vector;

electronically encoding, by the at least one electronic computer processor, retrieval augmented generation (RAG) to the at least one LLM;

electronically embedding, by the at least one electronic computer processor, the at least one LLM scoring vector and object semantic data; or electronically storing, by the at least one electronic computer processor, the at least one electronic document, along with the at least one LLM scoring vector and object semantic data in at least one database, wherein said at least one database is capable of storing vector data.

4. The method according to claim 1, wherein said electronically enriching of the at least one document comprises at least one or more of:

electronically enabling, by the at least one electronic computer processor, searching of the at least one electronic document via at least one large language model (LLM);

electronically scoring, by the at least one electronic computer processor, searching quality of the at least one electronic document to obtain at least one LLM scoring vector;

electronically enriching, by the at least one electronic computer processor, comprising electronic processing, by the at least one electronic computer processor, of at least one electronic prompt, with respect to the at least one electronically transformed document:

electronically encoding, by the at least one electronic computer processor, retrieval augmented generation (RAG) to the at least one LLM;

electronically embedding, by the at least one electronic computer processor, the at least one LLM scoring vector and object semantic data;

electronically enriching, by the at least one electronic computer processor, the at least one electronic document by electronically creating at least one data enrichment software agent;

electronically enriching, by the at least one electronic computer processor, the at least one document by electronically creating at least one open source data enrichment software agent;

electronically enabling, by the at least one electronic computer processor, creating of at least one new data enrichment agent;

electronically enabling, by the at least one electronic computer processor, creating of at least one new data enrichment software agent;

electronically enabling, by the at least one electronic computer processor, electronically creating of at least one new electronic data enrichment software agent by electronically processing at least one electronic prompt;

electronically enabling comparing, by the at least one electronic computer processor, the at least one electronic document via at least one new data enrichment agent;

electronically enabling comparing, by the at least one electronic computer processor, the at least one electronic document via at least one background new data enrichment agent;

electronically enabling searching, by the at least one electronic computer processor, the at least one electronic document via at least one new data enrichment agent;

electronically enabling, by the at least one electronic computer processor, electronically searching the at least one electronic document for at least one interesting fact via at least one new data enrichment agent;

electronically machine training building inferences, by the at least one electronic computer processor, from the at least one electronic document via at least one new electronic data enrichment agent; or electronically machine training discovering, by the at least one electronic computer processor, at least one new history from the at least one electronic document via at least one new electronic data enrichment agent.

5. The method according to claim 1, wherein said electronically enabling of the electronic semantic searching of the at least one electronically transformed document comprises at least one or more of:

electronically enabling, by the at least one electronic computer processor, electronically searching of the at least one electronically transformed document via at least one electronic large language model (LLM);

electronically scoring, by the at least one electronic computer processor, searching quality of the at least one electronically transformed document to obtain at least one electronic data indicative of at least one LLM scoring vector;

electronically encoding, by the at least one electronic computer processor, retrieval augmented generation (RAG) to the at least one electronic LLM;

electronically embedding, by the at least one electronic computer processor, the at least one electronic data indicative of at least one LLM scoring vector and electronic object semantic data;

electronically computing, by the at least one electronic computer processor, at least one electronic semantic embedding via the at least one electronic LLM;

electronically storing, by the at least one electronic computer processor, said at least one electronic semantic embedding in the at least one electronically transformed document;

electronically formatting, by the at least one electronic computer processor, said at least one electronically transformed document for a desired format;

electronically formatting, by the at least one electronic computer processor, said at least one electronically transformed document for a desired display format; or electronically formatting, by the at least one electronic computer processor, said at least one electronically transformed document for a desired browser display format.

6. The method according to claim 1, further comprising:

electronically receiving, by the at least one electronic computer processor, at least one electronic semantic search query;

electronically comparing, by the at least one electronic computer processor, said at least one electronic semantic search query to at least one electronic LLM-computed semantic embedding of a given document to obtain at least one electronic semantic search result document;

electronically readying, by the at least one electronic computer processor, for electronic display said at least one electronic semantic search result document; and electronically displaying, by the at least one electronic computer processor, said at least one electronic semantic search result document.

7. The method according to claim 1, wherein said at least one electronic document comprises at least one digitized version of at least one or more of:

a historical document;

a historical newspaper;

a newspaper of a substantially earlier period than an LLM training time period;

a historical document of an earlier period;

a historical document including regional colloquialisms or dialects;

a historical document from 1600s-1800s;

a historical document from 1600s-1900s;

a historical document from 1600s through today;

a historical document from 1800s through today;

a historical document from earlier than 1900;

a historical document from earlier than 1860s;

a historical document from the early 1800s;

a historical document from earlier than 1800;

a historical document from another language;

a pre-1900 historical document;

a pre-1800 historical document;

a document from pre-civil war era;

a document from the 1900s;

a historical document published between 1600 and 1899;

a historical document published from 1800 through today;

a pre-modern historical document published from about 1600 through the 1800s;

a late-modern historical document published from about 1800 through today;

a historical document published between 1550 and today;

a document from 1600 or more recently;

a document from 1700 and more recently;

a document from 1800 or more recently;

a document from 1900 or more recently;

a document from pre-civil war era;

a document from the 1900s;

a historical document published between 1600 and 1899;

a historical document published from 1800 through today;

an early modern English historical document;

a late modern English historical document;

a handwritten historical document;

a historical document with poor OCR quality;

a document before the 1950s;

a poorly preserved historical document; or a deteriorated historical document.

8. The method according to claim 1, wherein said electronically enabling of the electronic semantic searching of the at least one electronic document comprises:

electronically enabling, by the at least one electronic computer processor, electronically searching of the at least one document via a plurality of electronic large language models (LLMs).

9. The method according to claim 8, wherein said electronically enabling electronically searching of the at least one electronic document via the plurality of electronic large language models (LLMs) comprises at least one or more of:

electronically scoring, by the at least one computer processor, electronic results of said plurality of electronic LLM models; or electronically enabling, by the at least one computer processor, electronically searching of the at least one document via the plurality of electronic large language models (LLMs) wherein the plurality comprises an electronic LLM selected from at least one or more of:

CHATGPT;

CLAUDE;

GEMINI;

LLAMA;

GROK;

MISTRAL;

PALM2;

FALCON;

STABLE LM;

MIXTRAL;

INFLECTION;

JAMBA;

COMMAND R;

GEMMA;

PHI;

XGEN;

DBRX;

*PYTHIA;*

SORA;

ALPACA;

NEMOTRON, or a custom LLM.

10. The method according to claim 1, wherein the at least one electronic document is stored in an electronically digitized format comprising at least one or more of:

a portable document format (PDF);

a joint photographic experts group (JPEG) or JPG format;

a GIF format;

a computer readable format;

a Word document (DOC), DOCX, .doc, or .docx .format;

an audio video interleave (AVI) format;

a motion picture entertainment group (MPEG), MPEG Group4, .mpg, .mpeg, mpeg3, x-mpeg-3, mpeg, x-mpeg, or mp3 file format;

a flash video format, or .flv format;

a QuickTime (MOV), or .mov format;

a Windows Media (WMV), or .wmv format;

an image file format;

an audio file format;

a waveform audio file, .wav, or wave file format;

an audio interchange file, .aif, or aiff file format;

an ARC, .arc, or .arc .gz file format;

a Web ARChive file, warc, or .warc .gz file format;

a portable network graphics file (PNG), or .png file format;

a spreadsheet or Excel file (XLS), .xls, .xlsx, or .csv format;

a Powerpoint (PPT), .ppt, .pptx format;

a hypertext markup language (HTML), .html, or .htm file format;

a text (.txt) file format;

a Matroska (.mkv) format;

an encapsulated post script (EPS) format;

an ASCII format file;

an EBCDIC format file;

a JSON format file;

a MQTT format file; or a tagged image file format (TIFF), .tif, or tiff format.

11. The method according to claim 1, wherein the method further comprises at least one or more of:

electronically storing, by at least one electronic computer processor, the at least one electronic_document into at least one electronic database configured to electronically process vector results;

electronically storing, by at least one electronic computer processor, the at least one electronic document into at least one electronic structured query language (SQL) query-enabled relational database;

electronically evaluating or determining accuracy, by at least one electronic computer processor, electronic data indicative of the electronic score quality of the at least one electronic document;

electronically enabling, by the at least one electronic computer processor, electronic semantic search of electronic historical documents;

electronically defining, by the at least one electronic computer processor, limits of electronic semantic search;

electronically enabling, by the at least one electronic computer processor, electronically creating electronic searchable electronic historical documents;

electronically enabling, by the at least one electronic computer processor, electronically creating electronic searchable historical documents, wherein the electronic historical documents published from between 1600 to 1900s;

electronically enabling, by the at least one electronic computer processor, electronically creating electronically searchable historical documents, wherein the electronic historical documents published from between 1600 to 1800s;

electronically enabling, by the at least one electronic computer processor, electronically creating electronically searchable historical documents, wherein the historical documents published from between 1600 and today;

electronically enabling, by the at least one electronic computer processor, electronic software agents for electronic data enrichment electronically enabling electronic learning and electronically creating new and different historical inferences; electronically enabling, by the at least one electronic computer processor, open source software agents for electronic data enrichment electronically enabling electronic learning and electronically creating new and different historical inferences;

electronically enabling, by the at least one electronic computer processor, electronically creating of at least one new electronic data enrichment software agent by electronically processing at least one electronic prompt; or electronically enriching, by the at least one electronic computer processor, electronically processing at least one electronic prompt, with respect to the at least one document.

12. The method according to claim 1, wherein the method further comprises at least one or more of:

electronically enhancing, by the at least one electronic computer processor, by at least one retrieval augmented generation (RAG) enhanced, electronic LLM scoring, electronic vector and electronic object semantic embeddings of the at least one document and electronically storing along with the at least one electronic document in at least one electronic vector capable database;

electronically computing, by the at least one electronic computer processor, at least one new electronic LLM embedding and electronically storing, by the at least one electronic computer processor, in at least one electronic vector capable database;

electronically processing, by the at least one electronic computer processor, at least one electronic semantic search request electronic LLM embedding;

electronically comparing, by the at least one electronic computer processor, said at least one electronic semantic search request electronic LLM embedding with said at least one new electronic LLM embedding electronically stored in the electronic vector capable database to identify electronic results;

electronically enabling, by the at least one electronic computer processor, electronically creating at least one electronic data enrichment agent, wherein said at least one electronic data enrichment agent is configured to electronically make inferences based on electronically stored data, electronic prompts and electronic user queries;

electronically enabling, by the at least one electronic computer processor, electronically creating at least one electronic data enrichment agent, wherein said at least one electronic data enrichment agent is configured to electronically learn and discover electronically new history, by electronically identifying, by the at least one electronic computer processor, at least one connection between a plurality of said electronic documents, and electronic prompts in the at least one electronic historical digital archive;

electronically enabling, by the at least one electronic computer processor, electronically creating at least one electronic data enrichment agent, wherein said at least one electronic data enrichment agent is configured to electronically run over electronic data indicative of a corpus of data; or electronically enabling, by the at least one electronic computer processor, electronically creating at least one electronic data enrichment agent, wherein said at least one electronic data enrichment agent is configured to be open source so any end user can and electronically enabling programming of their own an electronic data enrichment agent configured to electronically find electronic data.

13. The method according to claim 1, wherein, the at least one electronic document comprises at least one digitized and machine-readable document.

14. The method according to claim 1, wherein said electronically_pre-processing of the at least one document comprises:

electronically making searchable, by the at least one electronic computer processor, the at least one electronic document with a plurality of LLMs to create at least one electronically searchable electronic document;

electronically scoring, by the at least one electronic computer processor, electronic data indicative of the quality of the at least one electronically searchable electronic document;

electronically evaluating or determining accuracy, by at least one electronic computer processor, the electronic score quality of the at least one electronically transformed document;

electronically retrieval-augmented generation (RAG)-encoding, by the at least one electronic computer processor, to the plurality of LLMs at least one historical insight of at least one determined close association between a given two electronic documents based on similar feature vectors of the given two electronic documents;

electronically embedding, by the at least one electronic computer processor, at least one electronic LLM scoring vector and electronic object semantics embeddings; and electronically storing, by the at least one electronic computer processor, the at least one electronically searchable document with the at least one electronic LLM scoring vector and electronic object semantics embeddings in at least one electronic database, wherein the at least one electronic database is configured to be capable of electronically storing vector data.

15. The method according to claim 14, further comprising at least one or more of:

electronically receiving, by the at least one electronic computer processor, at least one electronic semantic search; and electronically providing, by the at least one electronic computer processor, at least one electronic search result of at least one electronically searchable electronic document with the at least one electronic data indicative of at least one LLM scoring vector and electronic object semantics embeddings corresponding electronically_comparingly to said at least one electronic semantic search from said at least one electronic database.

16. The method according to claim 15, further comprising at least one or more of:

electronically creating, by the at least one electronic computer processor, at least one software data enrichment agent to electronically enable searching, by the at least one electronic computer processor, for at least one or more of:

electronic data indicative of at least one interesting historical facts;

electronically building at least one inference; or electronically discovering new history, by electronically identifying, by the at least one electronic computer processor, at least one connection between a plurality of said electronic documents in the at least one electronic historical digital archive by processing at least one electronic prompt.

17. The method according to claim 8, wherein said electronically enabling searching of the at least one electronic document via the plurality of large language models (LLMs) comprises at least one or more of:

electronically scoring, by the at least one electronic computer processor, electronic results of at least one of the plurality of electronic LLM models;

electronically modifying, by the at least one electronic computer processor, at least one document to produce electronic data indicative of at least one better character or word identification transformation (translation) score; or electronically enabling, by the at least one electronic computer processor, electronically searching of the at least one electronic document via at least one of the plurality of electronic large language models (LLMs).

18. The method according to claim 1, wherein said electronically enabling searching comprises:

electronically enabling, by the at least one electronic computer processor, electronically searching of the at least one electronic document via at least one custom electronic large language model (LLM).

19. The method according to claim 1, wherein said electronically evaluating or determining accuracy comprises:

electronically receiving, by the at least one electronic computer processor, a first electronic data indicative of a user reading manual visual review of identification of the contents transformation (user transformation) of a given document, assigning a highest quality score;

electronically receiving, by the at least one electronic computer processor, a second electronic data indicative of an electronic machine reading identification of the contents transformation (machine transformation) of the given document;

electronically comparing, by the at least one electronic computer processor, the second electronic data indicative of the machine transcription to the first electronic data indicative of the user transcription;

electronically determining, by the at least one electronic computer processor, electronic data indicative of a quality score for the second electronic data indicative of the machine transcription;

electronically assigning, by the at least one electronic computer processor, the second quality score to the second transcription of the machine transcription; and electronically modifying, by the at least one electronic computer processor, the electronic prompt and electronically repeating said electronically evaluating or determining accuracy until an acceptable electronic data indicative of a quality score is achieved.

20. The method according to claim 7, wherein said at least one digitized version comprises:

a historical document;

a historical newspaper;

a newspaper of a substantially earlier period than an LLM training time period;

a historical document of an earlier period;

a historical document including regional colloquialisms or dialects;

a historical document from 1600s-1800s;

a historical document from 1600s-1900s;

historical document before mid 1950s;

a historical document from 1600s through mid 1950s;

a historical document from 1800s through mid 1950s;

a historical document from earlier than 1900;

a historical document from earlier than 1860s;

a historical document from the early 1800s;

a historical document from earlier than 1800;

a historical document from another language;

a pre-1900 historical document;

a pre-1800 historical document;

a document from pre-civil war era;

a document from the 1900s;

a historical document published between 1600 and 1899;

a historical document published from 1800 through mid 1950s;

a pre-modern historical document published from about 1600 through the 1800s;

a late-modern historical document published from about 1800 through mid 1950s;

a historical document published between 1550 and today;

a document from 1600 or more recently through mid 1950s;

a document from 1700 and more recently through mid 1950s;

a document from 1800 or more recently through mid 1950s;

a document from 1900 or more recently through mid 1950s;

a document from pre-civil war era;

a document from the 1900s;

a historical document published between 1600 and 1899;

a historical document published from 1800 through mid 1950s;

early modern English historical document;

a handwritten historical document;

a historical document with poor OCR quality;

a late modern English historical document;

a poorly preserved historical document; or a deteriorated historical document.

21. The computer implemented method of claim 1, comprising at least one or more of:

wherein said at least one electronic database comprises at least one electronic search database and wherein said electronically storing comprises:

electronically storing the at least one search vector in the at least the vector-enabled portion of the at least one electronic search database;

wherein said electronic data indicative of the at least one search vector data comprises wherein the at least one search vector data comprises at least one or more of: facilitating semantic search and synonyms, facilitating finding trends indicative of poetry, rhyme or meter, or finding hidden history, and continually enriching based on the at least one search vector data;

wherein said electronic data indicative of at least one metadata enrichment comprises at least one or more of at least one electronic score quality metadata enrichment, or at least one print type or handwriting type of said at least one electronic document;

wherein the at least one language of the day enrichment comprises at least one or more of:

understandings of at least a portion of text of the at least one electronic document from the at least one electronic database, based on a time period of the original publication date of the at least one electronic document;

electronic data indicative of at least one element of contemporary knowledge of a time of original creation of the text of the at least one electronic document;

electronic data indicative of language of the day synonyms;

electronic data indicative of historical document style; or electronic data indicative of use of contemporary information comprising at least one or more of:

at least one vernacular, at least one rhyme, at least one meter, at least one poetry, at least one difference in spelling, at least one form of identification, at least one newspaper, at least one court record, at least one ship log, at least one log, at least one advertisement, at least one classified advertisement, or at least one portion of an old newspaper, and electronically improving at least one or more of:

embeddings of the LLM;

at the at least one vector; or retraining, regenerating, or customizing the LLM, or the at least the vector-enabled portion of the at least one electronic database; or wherein the at least one separate electronic data enrichment agent comprises at least one or more of:

electronically executing at least one pre-created, ad hoc, module performing a series of at least one electronic prompt instructions processing the at least one electronic historical digital archive corpus of the at least one electronic document;

electronically tailoring at least one search result comprising at least one or more of:

electronically finding the at least one electronic search result comprising at least one or more of:

at least one meter, at least one rhyming couplet, at least one meter, at least one poetry, at least one log, at least one court record, at least one ship log, at least one vernacular term, or at least one reference to at least one barn animal, and electronically filtering the at least one electronic search result, electronically continually running, in background; and electronically iteratively improving the at least one electronic search result.

22. An electronic data processing system of electronically processing at least one electronic document from at least one electronic historical digital archive corpus and electronically enabling electronic semantic searching of the at least one electronic document, the system comprising:

at least one electronic computer processor, coupled to at least one electronic memory storage device and coupled via at least one electronic communications interface, coupled to at least one electronic data communications network, the system comprising wherein said at least one electronic computer processor is configured to:

electronically pre-process the at least one electronic document from the at least one electronic historical digital archive corpus, wherein said electronically pre-process comprises wherein said at least one electronic computer processor is configured to:

electronically machine transform or read identification of contents ("electronic transform") the at least one electronic document comprising wherein said at least one electronic computer processor is configured to:

electronically machine transform or read identification of contents of the at least one electronic document using at least one electronic prompt, electronically received from at least one graphical user interface (GUI), to at least one electronic large language model (LLM), and electronically obtain from the at least one electronic LLM, electronically create embeddings for the at least one electronic LLM, and at least one electronically transformed document based on said at least one electronic prompt; and electronically store the at least one electronically transformed document and electronically created embeddings in at least one electronic database;

electronically evaluate or determine accuracy of electronic data indicative of an electronic score quality of the at least one electronically transformed document comprising:

electronically compare said electronic data indicative of said electronic score quality of the at least one electronically transformed document, to electronic data indicative of an electronic score quality of a user reading manual visual review of identification of the contents transformation ("user transform") of the electronic document; and electronically modify, iteratively, said at least one electronic prompt in order to vary said electronic score quality of the at least one electronically transformed document of said electronically evaluating;

electronically adding at least one electronic metadata to the electronically created embeddings in the at least one electronic database, wherein the at least one electronic database comprises:

at least a vector-enabled portion comprising:

electronic data indicative of at least one search vector data;

electronically enrich the at least one electronic document, wherein said at least one electronic computer processor is configured to at least one or more of:

electronically add electronic data indicative of at least one metadata enrichment to the at least one electronic database;

electronically process at least one electronically received prompt, with respect to the at least one electronically transformed document, comprising:

electronically enrich the at least one electronically transformed document, with at least one language of the day enrichment of the at least one electronically transformed document; or electronically create at least one separate electronic data enrichment agent comprising wherein said at least one electronic computer processor is configured to:

electronically return a subset of data;

electronically exclude another subset of data; and electronically add metadata; and electronically enable the electronic semantic searching of the at least one electronically transformed document, and electronically provide the at least one graphical user interface (GUI) to provide interactive user access.

23. A computer program product embodied on a computer accessible non-transitory storage medium, including at least one electronically stored instruction, which when executed on at least one electronic computer processor performs a method of processing at least one electronic document from at least one electronic historical digital archive_corpus and electronically enabling electronic semantic searching of the at least one electronic document, the method comprising:

electronically pre-processing, by at least one electronic computer processor, the at least one electronic document from the at least one electronic historical digital archive corpus, said electronically pre-processing comprising:

electronically machine transforming or machine reading identification of contents ("electronic transforming"), by the at least one electronic computer processor, the at least one electronic document comprising:

electronically machine transforming or machine reading identification of contents of the at least one electronic document, by the at least one computer processor, using at least one electronic prompt, electronically received from at least one graphical user interface (GUI), to at least one electronic large language model (LLM), and electronically obtaining from the at least one electronic LLM, by the at least one electronic computer processor, electronically creating embeddings for the at least one electronic LLM, and at least one electronically transformed document based on said at least one electronic prompt; and electronically storing, by the at least one electronic computer processor, the at least one electronically transformed document and electronically created embeddings in at least one electronic database;

electronically evaluating or determining accuracy, by the at least one electronic computer processor, of electronic data indicative of an electronic score quality of the at least one electronically transformed document, comprising:

electronically comparing, by the at least one electronic computer processor, said electronic data indicative of said electronic score quality of the at least one electronically transformed document, to electronic data indicative of an electronic score quality of a user reading manual visual review of identification of the contents transformation ("user transforming") of the electronic document; and electronically modifying, iteratively, by the at least one electronic computer processor, said at least one electronic prompt in order to vary said electronic score quality of the at least one electronically transformed document of said electronically evaluating;

electronically adding at least one electronic metadata, by the at least one electronic computer processor, to the electronically created embeddings in the at least one electronic database, wherein the at least one electronic database comprises:

at least a vector-enabled portion comprising:

electronic data indicative of at least one search vector data;

electronically enriching, by at least one electronic computer processor, the at least one electronic document, comprising electronically enriching, by the at least one electronic computer processor, the at least one electronic database, after the electronically transforming, comprising at least one or more of:

electronically adding, by the at least one electronic computer processor, electronic data indicative of at least one metadata enrichment to the at least one electronic database;

electronically processing, by the at least one electronic computer processor, at least one electronically received prompt, with respect to the at least one electronically transformed document, comprising:

electronically enriching, by the at least one electronic computer processor, the at least one electronically transformed document, with at least one language of the day enrichment of the at least one electronically transformed document; or electronically creating, by the at least one electronic computer processor, at least one separate electronic data enrichment agent comprising:

electronically returning, by the at least one electronic computer processor, a subset of data;

electronically excluding, by the at least one electronic computer processor, another subset of data; and electronically adding, by the at least one electronic computer processor, metadata; and electronically enabling, by at least one electronic computer processor, the electronic semantic searching of the at least one electronically transformed document, and electronically providing, by at least one electronic computer processor, the at least one graphical user interface (GUI) to provide interactive user access.

\* \* \* \* \*